United States Patent
Schiffman et al.

(10) Patent No.: US 10,600,060 B1
(45) Date of Patent: Mar. 24, 2020

(54) PREDICTIVE ANALYTICS FROM VISUAL DATA

(71) Applicant: A9.com, Inc., Palo Alto, CA (US)

(72) Inventors: Daniel Luke Schiffman, Cambridge, MA (US); William Brendel, San Francisco, CA (US); Christopher Joseph Hawley, Palo Alto, CA (US); David Creighton Mott, Los Altos, CA (US); Shruti Sheorey, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 944 days.

(21) Appl. No.: 14/577,838

(22) Filed: Dec. 19, 2014

(51) Int. Cl.
*G06Q 30/02* (2012.01)
*G06Q 50/00* (2012.01)
*G06K 9/20* (2006.01)
*G06K 9/62* (2006.01)

(52) U.S. Cl.
CPC ....... *G06Q 30/0201* (2013.01); *G06K 9/2054* (2013.01); *G06K 9/6202* (2013.01); *G06K 9/6215* (2013.01); *G06Q 50/01* (2013.01)

(58) Field of Classification Search
CPC ....................................... G06Q 30/02
USPC ........................................ 705/7.29
See application file for complete search history.

(56) References Cited

U.S. PATENT DOCUMENTS

| | | | | |
|---|---|---|---|---|
| 2005/0261990 A1* | 11/2005 | Gocht | .................. | G06Q 30/02 707/758 |
| 2008/0033776 A1* | 2/2008 | Marchese | ............. | G06Q 20/10 705/7.33 |
| 2010/0057691 A1 | 3/2010 | Geppert | | |
| 2010/0179874 A1* | 7/2010 | Higgins | ............. | G06K 9/00664 705/14.53 |
| 2012/0192227 A1* | 7/2012 | Fleischman | ........ | H04N 21/2407 725/34 |
| 2013/0173392 A1 | 7/2013 | Hull | | |
| 2013/0218616 A1* | 8/2013 | Pinchuk | ............. | G06Q 30/0202 705/7.11 |
| 2013/0258117 A1 | 10/2013 | Penov | | |

(Continued)

OTHER PUBLICATIONS

Non-Final Rejection issued in U.S. Appl. No. 14/577,795 dated Jun. 1, 2017.

(Continued)

*Primary Examiner* — Nga B Nguyen
(74) *Attorney, Agent, or Firm* — Hogan Lovells US LLP

(57) ABSTRACT

Various embodiments relating to predictive analytics from visual data are described. For example, a system associated with a matching service can obtain visual data that includes content related to a marketing campaign associated with a particular product or service. The system can determine image information that contains one or more objects relating to a logo for the particular brand or product. The system can process the content item using one or more machine vision algorithms. The system can determine usage data associated with the particular product or service based at least in part on the one or more feature descriptors. The system can aggregate the usage data with other usage data relating to different users across different time periods to compile a database of insight information with respect to the particular product or service. The system can determine one or more usage patterns relating to the particular product or service.

20 Claims, 13 Drawing Sheets

(56) References Cited

U.S. PATENT DOCUMENTS

| | | | | |
|---|---|---|---|---|
| 2013/0297694 A1* | 11/2013 | Ghosh | .................... | H04L 67/02<br>709/204 |
| 2013/0330019 A1* | 12/2013 | Kim | ....................... | G06T 11/60<br>382/298 |
| 2013/0339521 A1 | 12/2013 | Hebeler | | |
| 2014/0019264 A1* | 1/2014 | Wachman | .......... | G06Q 30/0276<br>705/14.72 |
| 2014/0040371 A1* | 2/2014 | Gurevich | ................ | H04W 4/21<br>709/204 |
| 2014/0244429 A1* | 8/2014 | Clayton | ............. | G06Q 30/0631<br>705/26.7 |
| 2014/0278998 A1 | 9/2014 | Systrom | | |
| 2014/0279068 A1* | 9/2014 | Systrom | ............. | G06Q 30/0277<br>705/14.73 |
| 2014/0351045 A1* | 11/2014 | Abihssira | ......... | H04N 21/25841<br>705/14.53 |
| 2015/0039524 A1 | 2/2015 | Leach | | |
| 2015/0081417 A1* | 3/2015 | Golden | ............. | G06Q 30/0242<br>705/14.41 |
| 2015/0149539 A1* | 5/2015 | Shukla | .................... | H04L 67/22<br>709/204 |
| 2015/0154167 A1* | 6/2015 | Arhin | ................ | G06F 17/30386<br>715/233 |
| 2015/0169634 A1 | 6/2015 | Li | | |
| 2015/0170039 A1* | 6/2015 | Hostyn | ............. | H04N 1/00204<br>348/207.1 |
| 2015/0186425 A1 | 7/2015 | Chang | | |
| 2015/0199727 A1* | 7/2015 | Naveh | ................ | G06Q 30/0269<br>705/14.66 |
| 2015/0206349 A1* | 7/2015 | Rosenthal | ........ | H04N 21/41407<br>345/633 |
| 2015/0254723 A1* | 9/2015 | Chand | ................ | G06Q 30/0269<br>705/14.66 |
| 2016/0019581 A1* | 1/2016 | Wu | .................... | G06Q 30/0244<br>705/14.43 |
| 2016/0148298 A1* | 5/2016 | Tang | .................. | G06K 9/00288<br>705/26.7 |
| 2016/0188633 A1* | 6/2016 | Wang | ................ | G06F 17/30867<br>707/728 |

OTHER PUBLICATIONS

Final Rejection issued in U.S. Appl. No. 14/577,795 dated Nov. 30, 2017.
Non-Final Rejection issued in U.S. Appl. No. 14/577,815 dated Jul. 14, 2017.
Final Rejection issued in U.S. Appl. No. 14/577,815 dated Jan. 23, 2018.
Non-Final Rejection issued in U.S. Appl. No. 14/577,795 dated May 14, 2018.
Final Rejection issued in U.S. Appl. No. 14/577,795 dated Jan. 10, 2019.
Non-Final Rejection issued in U.S. Appl. No. 14/577,815 dated Jun. 7, 2018.
Final Rejection issued in U.S. Appl. No. 14/577,815 dated Jan. 11, 2019.
Non-Final Rejection issued in U.S. Appl. No. 14/577,815 dated Mar. 22, 2019.
Non-Final Rejection issued in U.S. Appl. No. 14/577,795 dated Apr. 15, 2019.
Non-Final Rejection issued in U.S. Appl. No. 14/577,815 dated Aug. 14, 2019.

* cited by examiner

PREDICTIVE ANALYTICS FROM VISUAL DATA

BACKGROUND

Users are increasingly utilizing electronic devices to generate and obtain various types of information. For example, consumers generate content such as photos, videos, and text, and share this content with other consumers, such as via social media. Often, this content contains information reflecting a consumer's brand preferences. In this regard, community, social media or similar brand managers currently run social media campaigns using hash tags for customers to share and discover relevant content. For a variety of reasons, though, users often do not mark photos with the appropriate hash tag; as such, visually rich content is lost to the marketing campaign and demographic insights are lost to the brand stakeholders. Moreover, product marketers currently aggregate data on product/brand usage online by parsing text in hash-tagged content on social media and using conventional ecommerce metrics.

BRIEF DESCRIPTION OF THE DRAWINGS

Various embodiments in accordance with the present disclosure will be described with reference to the drawings, in which.

DETAILED DESCRIPTION

Figure 1A:
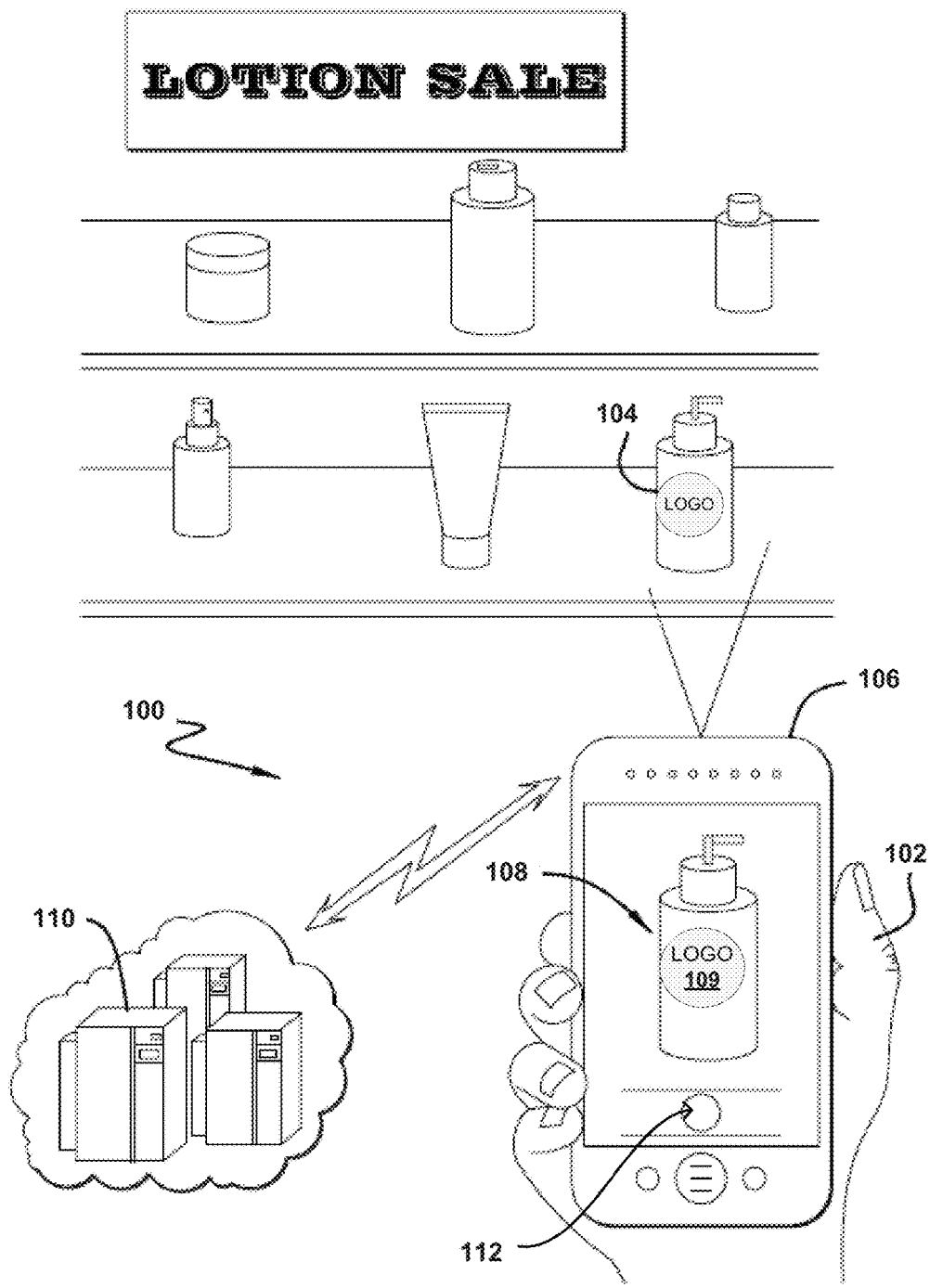
FIGS. 1A-1B illustrate examples of a user visually tagging content with a computing device, according to certain aspects of the subject technology.

Systems and methods in accordance with various embodiments of the present disclosure may overcome one or more of the aforementioned and other deficiencies experienced in conventional approaches to visual tagging in social media images. As such, the present disclosure relates to the utilization of computer vision (or machine vision) to recognize brand logos in customer photos, allowing influencers to share their love of a brand without the social stigma of tagging content with a corporate hash-tag, and providing campaign managers with a tool to discover social media content from users who support their brand. In particular, various embodiments may obtain an image representation of an object for use in logo matching and visual tagging. For example, a logo match based visual tagging system can determine a user that elected to opt into a marketing campaign associated with a particular product or service. The system can obtain at least one content item associated with the user, and determine at least one of a query image or a set of query frames included in the at least one content item. The system can send the at least one of the query image or a first query frame of the set of query frames to a matching service. The system can receive a matching result from the matching service, the matching result including at least an indication of a matching object relating to a logo associated with the particular product or service. The system can further send tag information to a repository associated with the marketing campaign.

In other aspects, the image representation of the object for use in logo matching and visual tagging may be captured irrespective of an action corresponding to user input, such as auto image capture. For example, the system can receive user input corresponding to an action for activating an application associated with the at least one capture device. The system can detect image information of an environment at which the system is located using at least one capture device of the system. The image information may include data for one or more objects within a field of view of the at least one capture device. The system can identify one or more feature descriptors associated with the one or more objects, and send at least a portion of the image information including the one or more feature descriptors to a matching service. The matching service may be associated with a network entity that is communicatively coupled to the system over a communication link. The system can receive an indication from the matching service that the at least a portion of the image information corresponds to a matching object associated with a marketing campaign. The matching object may relate to a logo associated with a particular brand or product. The system can further capture the detected image information as an image based at least in part on the received indication.

Systems and methods in accordance with various embodiments of the present disclosure may overcome one or more of the aforementioned and other deficiencies experienced in conventional approaches to aggregation of hash-tagged content in social media images. For example, photos that contain products from a specific brand can be useful since they provide detailed feedback about habits and preferences of consumers in their natural setting; however, the visual data in these images needs to be recognized and searchable. As such, the subject application also relates to the utilization of a combination of computer vision techniques such as image match, deep learning, optical character recognition, human recognition, poselet analysis, and scene understanding to analyze images, recognize products and brands, glean demographic insights, and collect product/brand usage data and trends. In this respect, a system associated with the matching service can obtain visual data that includes content related to a marketing campaign associated with a particular product or service. The system can determine a content item from the visual data. In this regard, the content item may include image information associated with a particular user, in which the image information contains one or more objects relating to a logo for the particular brand or product. The system can process the content item to extract one or more feature descriptors corresponding to the one or more objects using one or more machine vision algorithms. The system can determine usage data associated with the particular product or service based at least in part on the one or more feature descriptors. The usage data may correspond to a specified time period for the particular user. The system can aggregate the usage data with other usage data relating to different users across different time periods to compile a database of insight information with respect to the particular product or service. The system can correlate the database of insight information to determine one or more usage patterns relating to the particular product or service. The system can further generate a report including an indication of the one or more usage patterns.

The terms "computing device," "client device" and "mobile device" are used interchangeably herein to refer to any one or all of servers, personal computers, smartphones, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor.

As used herein "image matching" or "logo matching" is a technique being used in computer vision, object recognition, motion tracking, three-dimensional (3D) modeling, and the like, which can be performed to check whether two images contain the same content. For example, a user interested in determining availability of a movie in a video streaming service can capture an image of a book represented in the movie and submit that image to an image matching service as a query image in order to be provided with information associated with the movie containing a scene depicting the book in return. In order to accomplish this, features of the query image can be transformed into feature descriptors and compared to feature descriptors of images of books, in this example, stored with the image matching service. Once a corresponding match is identified, information associated with the matching image (e.g., information for searching the movie) can be provided and displayed to the user on their computing device.

Image computational processing such as higher level machine vision processing performed by a device processor (e.g., digital signal processor (DSP)) can include gesture tracking, head/face tracking, object tracking, face/object recognition, multiple image stereo processing (e.g. image rectification, generating stereo disparity maps), three dimensional image capture, metadata tagging of the image data (e.g., geo-tagging, time-stamping), symbol reading (e.g., barcodes, QR codes), optical character recognition (OCR), one or more image fusion algorithms, sensor fusion algorithms, and the like. Other tasks can include basic level image processing, including additions and subtractions of image data that can be used for object detection, windowing of a detected object, image segmentation, exposure duration determination, ambient light determination, etc. As used herein, machine vision processing can include any process that can be used to analyze an image and extract, deduce or learn information about that image. For example, the device processor can process image data to determine when a user has made a particular hand gesture (e.g., gesture tracking), detect when a specific face is recognized (e.g., face recognition), identify that a barcode has been read and provide the value of the barcode (e.g., symbol reading), or determine other information that can be provided to the device processor and be used to control the user interface of the computing device.

For example, the system can extract features from each of the images using a feature extraction algorithm (e.g., Accumulated Signed Gradient) and transform the extracted features for each image into feature descriptors which can be subsequently stored and used to compare against query images submitted by users or otherwise obtained (e.g., from third party service providers).

FIG. 1A illustrates example situation 100 wherein user 102 is interacting with computing device 106. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others.

In FIG. 1A, computing device 106 has at least one image capture element, such as a camera, operable to perform functions such as image and/or video capture. Each image capture element may be, for example, a charge-coupled device (CCD), a motion detection sensor, or an infrared sensor, or can utilize another appropriate image capturing technology. In this example, the user 102 is interested in obtaining image information that features item 104 which, in this example, is a bottle of lotion of a particular brand located in a store. The item 104 includes a logo 109 that corresponds to the particular brand. In this case, the logo 109 may relate to a popular lotion brand or product. In order to obtain the image information, the user 102 can position computing device 106 such that at least the relevant portion of item 104 is within a field of view of at least one camera of the computing device 106. The resulting image 108 can then be displayed on a display screen of the computing device 106. Image 108 can be a still image that was captured by the camera, or can be a frame of a "live" view as captured by a video mode of the camera, etc. In an aspect, the user 102 causes image 108 to be captured in response to the user 102 pressing (or touching) a camera function button 112 rendered on the display screen. In turn, the image 108 is uploaded to server 110 of, for example, a third party social media site (or social network) for sharing with other users.

Figure 1B:
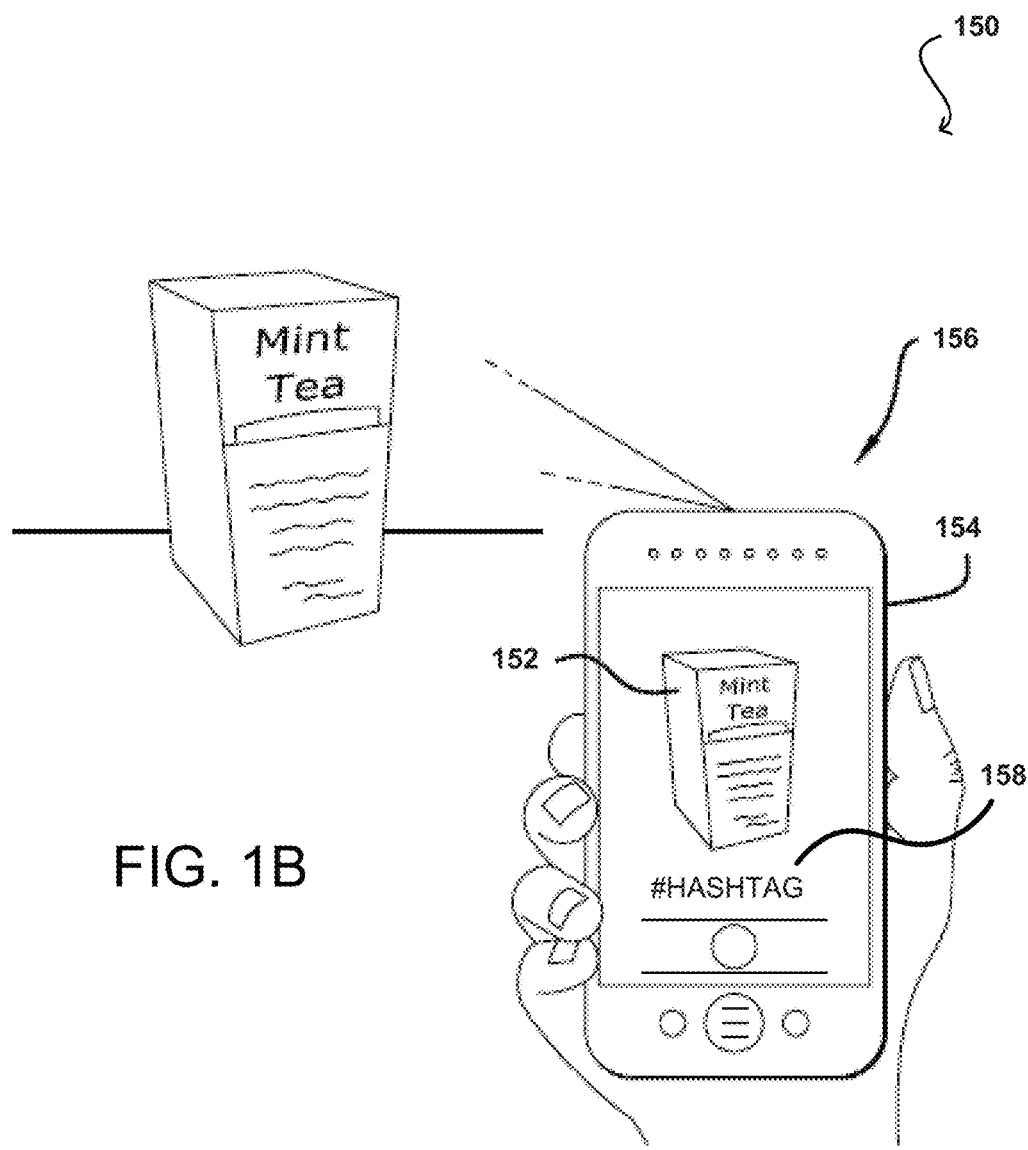

FIG. 1B illustrates example situation 150 wherein a user is capturing an image of a box of mint tea 152 with computing device 154 to submit the same as a hash-tagged image. The user can mark the captured image with a hash-tag 158 to enable other users of the third party social media site (or other social network) to share and discover relevant content. Upon capturing an image of the box of mint tea 152, the user can send the hash-tagged image to a social network site, or the hash-tagged image can be automatically sent by computing device 154. In some examples, the hash-tag 158 can be entered via a text entry user interface of the computing device 154 such that the hash-tag 158 includes one or more characters (e.g., letters and/or numerals).

The fastest growing social networks are photo (or image) based, with users of popular social media sites uploading approximately 410 Million photos each day, and approximately tagged with 4.3 Billion likes (e.g., an indication of interest to users). Approximately 62% of these users are likely to shop at a social media site if they know friends shopped there. Brand managers attempt to tap into this vast network with hash-tag based contests and promotions. The problem is 70% of consumers do not tag their photos with branded hash-tags for fear of being pushy. Even when they do tag content, friends often ignore branded hash-tags. Also, if a user mistypes a hash-tag, or creates an uncommon or unknown hash-tag, the brand recognition can go undiscovered.

By using computer vision to recognize logos in user photos, the present disclosure, as will be discussed in further detail with respect to FIGS. 2A-2C, allows brands to run social media campaigns, contests and promotions without the use of hash-tags. This enables product influencers to share products they love, without having to explicitly tag their corporate support. For example, the present disclosure can be deployed in an electronic device application as a standalone application, on a device such as a smartphone, or as a service pulling content from social media sites and remote cloud storage mediums. The present disclosure may only require access to user photos but may be implemented any other media associated with a user. The present disclosure can include a back-end logo match service and analytics tool to be commercialized as a SaaS platform (e.g., Software as a Service) for use by a third party service provider as well as third party brands. The brands can use the SaaS platform to create and manage specific campaigns, monitor brand exposure within photographs across social media sites, and analyze robust data on how, where, when, why and who of where the brand or product appeared.

There can be several benefits of implementing the present disclosure relating to hash-less visual tagging. The benefits with respect to a third party service provider (e.g., an electronic marketplace) can include: (1) generation of revenue from SaaS platforms that enable brand campaign creation and management, logo detection, and matching in images and marketing analytics; (2) brand analytics provide the third party service provider deeper insights into customer demographics, behavior and product usage; (3) a tool to collect and analyze social and visual marketing data on a brand associated with the service provider and/or other brands commercialized by the service provider; and (4) generate more targeted and strategic product recommendations and advertisements. The benefits with respect to a brand manager can include: (1) increased customer engagement with brand through creative social media campaigns; (2) more robust analysis on the product and brand usage/exposure as opposed to just hash-tags; (3) create advertising content from real user photos collected through the hash-less system; (4) generation of marketing analytics, usage data of specific products in a non-promotional setting; and (5) promote less friction for influencers to support a brand. In turn, the benefits with respect to a customer can include: (1) promote less friction to join ad campaigns by using visual recognition instead of hash-tags on social media picture posts; (2) receive rewards for posting pictures of a brand in the background of pictures or without an active campaign (e.g., democratizing product placement); (3) receive rewards for posting pictures of another brand, because the competing brand has targeted the customer as a future potential customer; (4) receive rewards for capturing pictures with products and/or brands in them without using hash-tags; and (5) become popular (or famous) if the customer has opted into a campaign for a brand and has a photo of the customer featured in an advertisement by the brand.

Various other functions and advantages are described and suggested below as may be provided in accordance with the various embodiments.

Figures 2A, 2B, 2C:
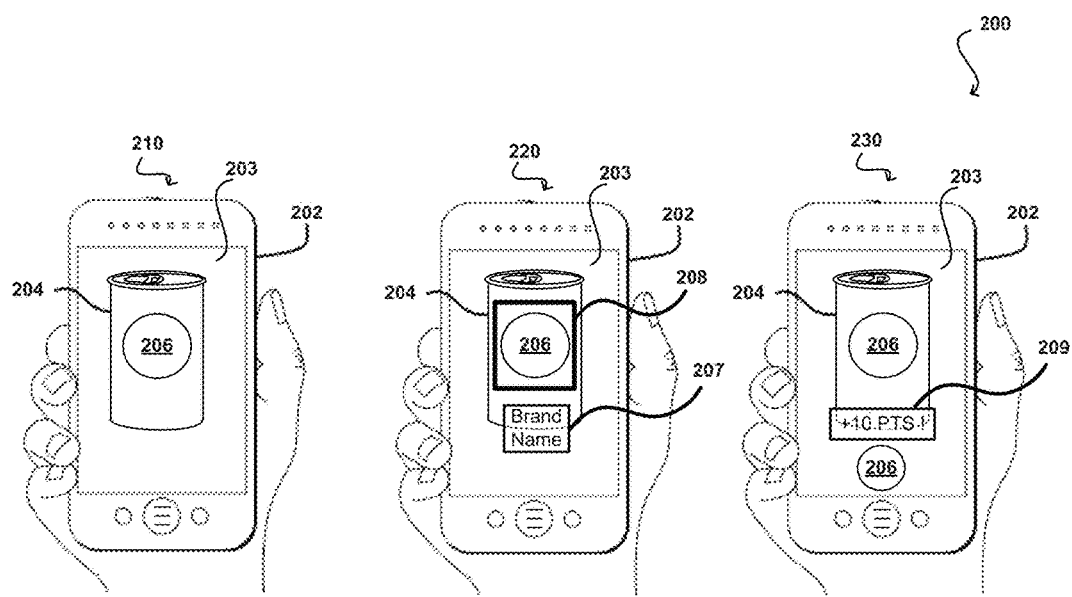
FIGS. 2A-2C illustrate an example logo match based visual tagging system, according to certain aspects of the subject technology.

FIGS. 2A-2C illustrate an example logo match based visual tagging system 200, according to certain aspects of the subject technology. In FIG. 2A, an example situation 210 is illustrated wherein a user is capturing an image 203 of a canned beverage item 204 with computing device 202 to submit the same as a query image. In turn, the image 203 is uploaded to a server (not shown) of, for example, a logo matching service and, therefore, capable of running one or more image matching analysis or object recognition algorithms to attempt to recognize logo 206 within image 203.

In an aspect, the user as a customer opts into a brand campaign, contest or promotion that allows the logo match based visual tagging system 200 to access the user's photos, potentially including photos on a specific social media site (e.g., Facebook®, Instagram®), photos on the user's device (e.g., the computing device 202), photos in a remote cloud storage medium, and/or photos upload through a mobile application (e.g., native application, dedicated application or web application). In some embodiments, the user is considered opted-in based on the user associating a personal photo feed public, such as by the privacy settings of a social media site.

In this example, images intended for use are sent to a server that conducts brand logo detection and recognition via logo match. In this regard, the server performs one or more computer vision algorithms as part of the logo matching service. Images can be sent by a mobile application either as customer-captured photos or as frames from a video stream. In an aspect, images are submitted by an intermediate service that is pulling customer content from social media sites.

In FIG. 2B, an example situation 220 is illustrated wherein a match is found by the logo match based visual tagging system 200. In this example, when the logo 206 matching the brand in question is found, the server returns a success code along with a bounding box (or rectangle) 208 of the logo 206 in the image 203. In this example, the bounding box 208 is provided for display to be located over the image 203 such that the bounding box encloses the logo 206. The bounding box can identify the logo 206 as the matching logo along with a brand name caption 207 to identify the corresponding brand.

In some aspects, the image representation of the canned beverage item 204 is captured irrespective of any action corresponding to user input for initiating image capture. Upon receiving a successful logo match result for a "live" view of an image, the mobile application can trigger to save the image automatically as a photo. In an aspect, a user interface (UI)/user experience (UX) common to a photo being napped is provided to enhance the user experience of the image capture. In another aspect, the snapped photo is stored on a digital photo library of the computing device 202. The photo may be uploaded to a social media site for the customer to share with followers and friends.

In FIG. 2C, an example situation 230 is illustrated wherein the mobile application or intermediate server (not shown) receiving the results from the server submits the image 203 to a remote cloud storage medium associated with the marketing campaign, along with meta information describing the discovered logo (e.g., logo 206) and the location of the corresponding bounding box in the image 203 as well as information identifying the customer. In turn, the mobile application or intermediate server gives access to the sent image 203 to the brand sponsoring the marketing campaign including additional marketing data regarding the user and the submitted image 203. In this respect, the customer can be awarded points in a contest as part of the marketing campaign. For example, the brand can award the user 10 points (e.g., rewards caption 209) as part of the contest for expressing an interest in the brand via the canned beverage item 204 with the logo 206. In this example, the rewards caption 209 is located adjacent to the canned beverage item 204 along with a caption of the logo 206. In an aspect, the rewards caption is an overlay located over the item 204.

Figure 3:
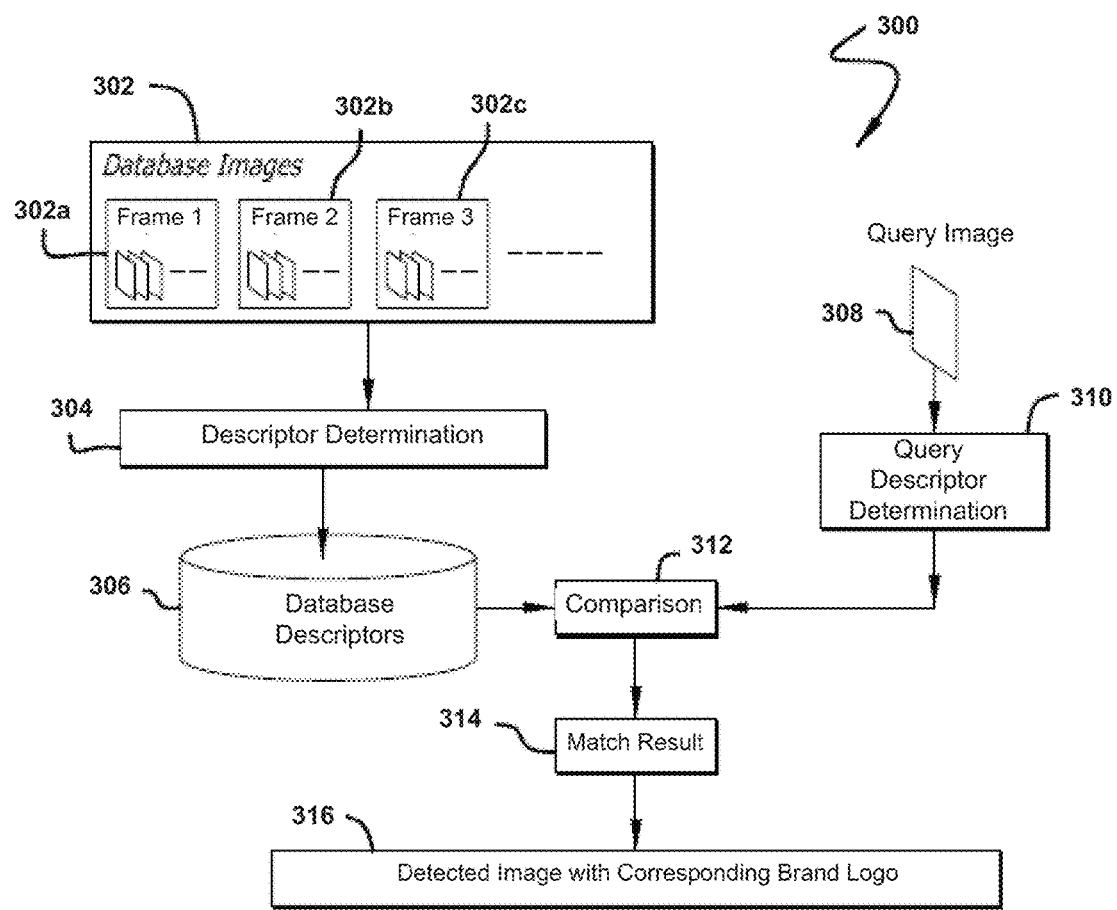
FIG. 3 illustrates an example processing through the logo match based visual tagging system, according to certain aspects of the subject technology.

FIG. 3 illustrates an example process 300 through a logo match based visual tagging system. In this example, the logo match based visual tagging system is representative of a logo matching service. In operation, the logo matching service obtains a database 302 containing content items to perform object recognition (or logo recognition) for product brand campaigns. In this example, the content items relate to photographic images containing one or more objects that potentially represent a brand logo.

The content items may relate to video frames. In an aspect, the logo matching service determines scene boundaries for a given video content item (e.g., sparse sampling) featuring objects of interest across multiple scenes in order to match an image of a respective object (e.g., a brand logo) from more than one scene. For example, the logo matching service analyzes the video at the start, middle and end of every scene in the video content item. As a result, processing time can be substantially reduced as opposed to analyzing each frame for every scene in the video. In some aspects, the logo matching service analyzes one frame from the middle of every scene in the video.

The logo matching system may analyze image frames containing interest points or corners that are identifiable by feature extraction algorithms. For example, if there is a scene in a big dark room, and there is insufficient lighting, the logo matching service can briefly analyze the frame and move on (e.g., the frame is not sent for further processing).

The logo matching service includes descriptor determination 304, in which feature points can be extracted from a given image, a given frame or a given scene contained in or added to database 302. The feature descriptors may be extracted using a feature extraction algorithm, such as Accumulated Signed Gradient (ASG), a Scale-Invariant Feature Transform (SIFT) algorithm, Harris corner detection algorithm, or the like.

Typical image matching algorithms take advantage of the fact that an image of an object, frame or scene contains a number of feature points (e.g., specific points in an image that are robust to changes in image rotation, scale, viewpoint or lighting conditions). Accordingly, these feature points will often be present in both of two different images of an object or scene, even if the two images differ. In some aspects, features for each frame corresponding to a scene are obtained.

In an aspect, the logo matching service processes the feature points using dense sampling. For example, specified points may be placed on an image, and features determined around those placed points can be extracted. As such, the dense sampling may be performed irrespective of the strength of the features (e.g., with respect to a specified threshold).

In some embodiments, the descriptor determination 304 includes functionality to analyze a color palette, lighting, audio fingerprint, and other elements of the content while processing the content items included in the database 302. In this respect, the logo matching service can be based on extractions that are not solely object driven but rather based on extractions with a common color scheme, audio fingerprint or other related aspects. In an aspect, the color palette for one of the content items in the database 302 is analyzed to understand scenes or activities that have certain color schemes, e.g., a frame of a video scene with blue tint that relates to a particular product brand.

The feature descriptors can be assigned to visual words or mapped to each of their own respective closest visual word. Each visual word may represent a small portion of content by carrying some kind of information related to its respective representative feature (e.g., color, shape, texture, size etc.), or changes occurring in pixels contained in the content item such as the filtering, low-level feature descriptors, and the like. Accordingly, a collection of visual words (i.e., a vocabulary) can provide information about a respective content item and the visual data contained therein. The vocabulary can enable the use of standard text search and retrieval techniques for logo recognition from visual data.

Accordingly, the feature descriptors extracted from each of the content items included in the database 302 are stored in descriptor database 306 and used to compare against query images submitted by users and/or pulled from an intermediate server. Upon obtaining query image 308 from a user or the intermediate server, query feature descriptors for features presented in the query image 308 are determined (e.g., query descriptor determination 310). In turn, the query feature descriptors can be processed in a comparison 312 against the feature descriptors stored in descriptor database 306. As a result, a matching result 314 is determined and returned when feature descriptors for an image of database 302 matches query feature descriptors for a brand logo included in query image 308. In this example, the matching result 314 can include an indication that the logo matching service was successful in finding a match (e.g., detected image with corresponding brand logo 316). In addition, the matching result 314 can include another indication of the matching brand logo (e.g., bounding box) with identifying information relating to the brand logo and user, which can be provided and displayed to the user on an associated computing device.

Figure 4A:
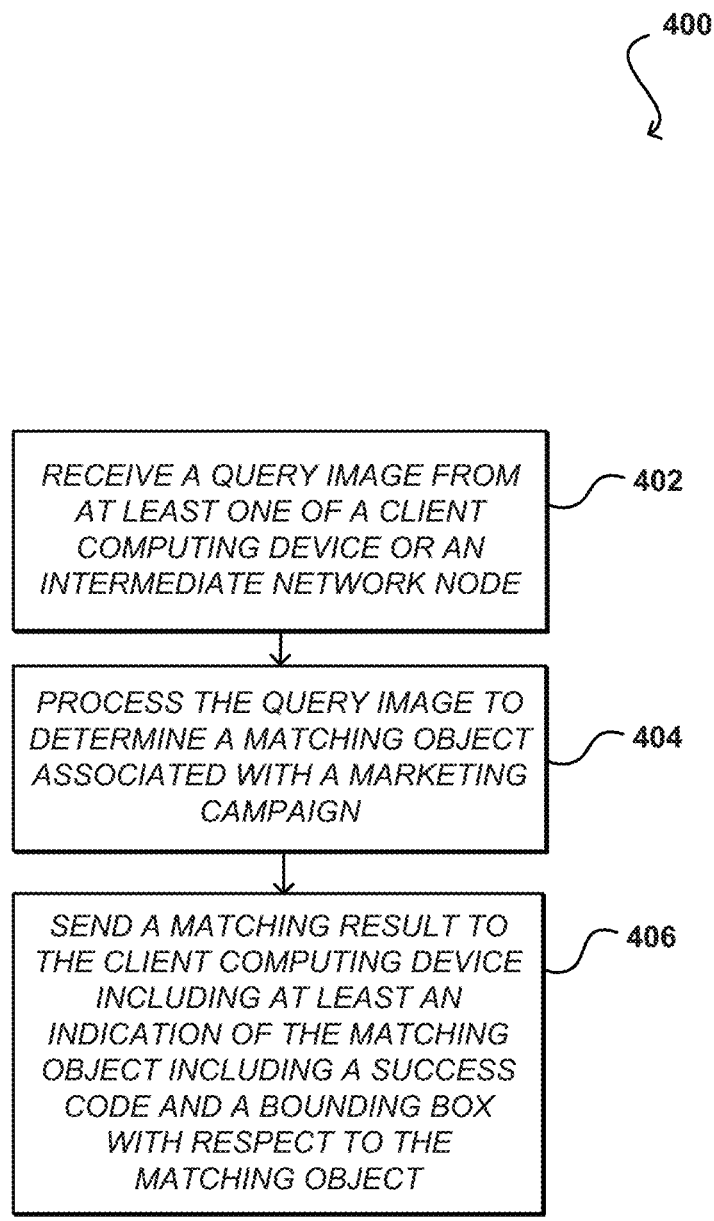
FIGS. 4A-4B illustrate flow charts of example processes for logo match based visual tagging and analytics on a computing device, according to certain aspects of the subject technology.
Figure 4B:
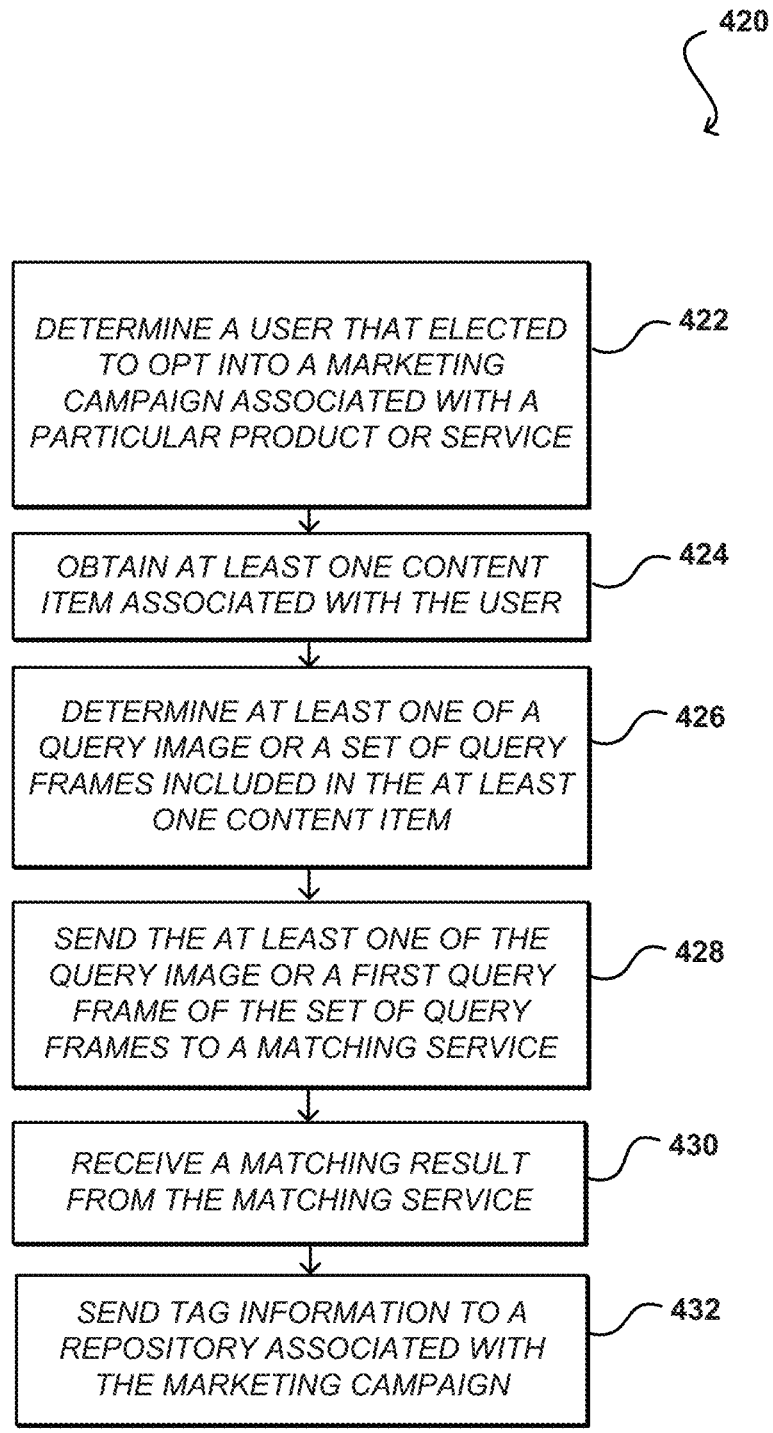

FIGS. 4A-4B illustrate flow charts of example processes for logo match based visual tagging and analytics on a computing device, e.g., the computing device 202 as shown in FIGS. 2A-2C, in accordance with various embodiments. It should be understood that, for this and other processes discussed herein, there can be additional, fewer, or alternative steps, performed in similar or alternative steps, or in parallel, within the scope of the various embodiments unless otherwise stated.

In FIG. 4A, a flow chart of an example process 400 for a logo match service performed on a computing system (e.g., a server) is described. For example, the logo matching service can receive a query image from at least one of a client computing device over a first communication link or an intermediate network node over a second communication link (402). The client computing device may be associated with a user that elected to opt into a marketing campaign associated with a particular product or service. In turn, the system can process the query image to determine a matching object associated with the marketing campaign (404). The matching object relating to a logo associated with the particular product or service. As discussed elsewhere herein, the marketing campaign can be generated in a number of different ways, such as by allowing a campaign manager to provide a set of logos and indicate which types of matches are to be included or utilized for the campaign. This can include, for example, attempting to obtain from users any image containing a specified logo. Other information might be obtained as well or alternatively, such as may include locations and times where the logos were detected, etc. A campaign manager can also indicate to allow certain images to be shared on social media, tagged with specific campaign information, etc.

The system can send a matching result to the client computing device including at least an indication of the matching object including a success code and a bounding box with respect to the matching object (406). In some aspects, the matching result enables the client computing device or the intermediate network node to send tag information to a repository associated with the marketing campaign. The tag information can include an indication of the matching object to enable the marketing campaign to acknowledge the user through the marketing campaign. In an aspect, the success code relates to an indication of a successful match between the query image and logo information stored in a repository associated with the computing device.

The system can extract query feature descriptors from the query image. In turn, the system can compare one or more of the extracted query feature descriptors to an index of feature descriptors to identify one or more brand logos that at least partially match the query image based at least in part on a respective number of query feature descriptors in the query image matching a respective number of feature descriptors in the index. The system can receive query feature descriptors including corresponding timestamp information from the client computing device. In this example, the query feature descriptors may be extracted from the query image at the client computing device.

In FIG. 4B, an example process 420 for the logo match service performed on a computing device (e.g., client computing device or an intermediate server) is illustrated. In step 422, the computing device can determine a user that elected to opt into a marketing campaign associated with a particular product or service. For example, the computing device may obtain a profile associated with the user that includes one or more settings relating to the marketing campaign. The computing device can obtain the profile associated with the user from a third party social network site. The computing device can further determine that one or more settings of the profile enable the user to opt into the marketing campaign. In this example, the one or more settings may relate to privacy settings for a photo feed associated with the profile. In an aspect, the computing device may display a prompt requesting the user to provide user input relating to the marketing campaign. In this example, the prompt may be triggered by activation of an application associated with the marketing campaign or detection of the particular product or service in usage data of the computing device.

In step 424, the computing device can obtain at least one content item associated with the user. In an aspect, the at least one content item is obtained from at least one of a third party social network site associated with the user. The at least one content item may be obtained from a local repository on the computing device. Alternatively, the at least one content item may be obtained from a repository on a cloud network communicatively coupled to the computing device. In some aspects, the at least one content item is obtained from an upload through an application running on the computing device.

In an aspect, the at least one content item relates to image information relating to the user. The computing device can capture image information representing the at least one content item using at least one image capture device of the computing device. The image information may be stored in the memory of the computing device. In other aspects, the at least one content item relates to video information that includes one or more frames. In this example, each frame may represent image information.

In step 426, the computing device can determine at least one of a query image or a set of query frames included in the at least one content item. Depending on implementation, the computing device can detect whether the at least one content item relates to image information or video information to thereby extract feature descriptors using a respective extraction algorithm.

In step 428, the computing device can send the at least one of the query image or a first query frame of the set of query frames to a matching service. In this example, the computing device may send the query image or first query frame automatically to the matching service. In an aspect, the computing device sends the query image or first query frame in the form of feature descriptors to be compared against other feature descriptors of the matching service.

In step 430, the computing device can receive a matching result from the matching service. In this respect, the matching result includes at least an indication of a matching object included in the at least one of the query image or the first query frame. In this example, the matching object relates to a logo associated with the particular product or service. In some aspects, the matching result includes a success code and a bounding box with respect to the matching object. The success code may relate to an indication of a successful match between the at least one of the query image or the first query frame and logo information stored in a repository associated with the matching service. In some aspects, the computing device establishes a second communication link with a second network entity associated with the matching service such that the computing device can receive the matching result via the second communication link while the computing device communicates with the first network entity associated with marketing campaign via the first communication link.

The computing device may be configured to store the captured image information in a second format based at least in part on an indication of a successful match included in the matching result. In this example, the second format has a picture quality that is greater than the first format. This is because the version sent to the matching service would require less overhead than the version stored on the computing device. In other examples, the picture quality may be the same in both the first and second formats. In an aspect, the image information is uploaded to the third party social network site.

In step 432, the computing device can send tag information to a repository associated with the marketing campaign. The computing device may establish a communication link with a network entity associated with the marketing campaign. In this example, the computing device can send the tag information to the network entity via the communication link. The network entity may include the repository.

In some aspects, the tag information includes an indication of the matching object to enable the marketing campaign to acknowledge the user through the marketing campaign. The campaign acknowledgment can cause an increase in engagement for brands by getting more customer involvement. The tag information may include metadata that relate to a description of the matching object, a location of the bounding box and information about the user. The tag information can be used towards usage data metrics including predictive analytics.

The tag information can be used to target advertisements and recommendations for certain customers based on their product usage. For example, the computing device can receive advertisement data associated with the particular product or service based at least in part on the tag information. In addition, the computing device may receive one or more recommendations relating to the particular product or service based at least in part on the tag information.

Figure 5:
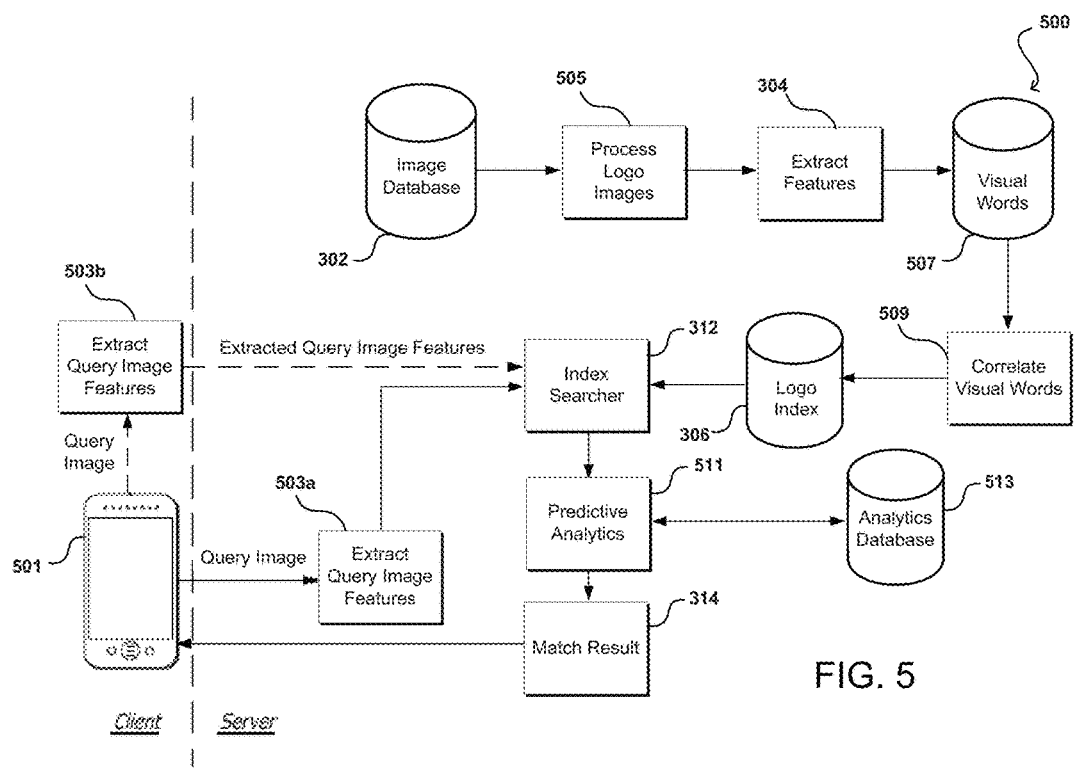
FIG. 5 illustrates another example processing through a logo match based visual tagging and analytics system, according to certain aspects of the subject technology.

FIG. 5 illustrates another example process 500 through a logo match based visual tagging and analytics system. In this example, computing device 501, e.g., the computing device 202 as shown in FIGS. 2A-2C, sends the query image to the logo matching service where, upon receiving the query image, the service extracts query image features 503a and calculates query features descriptors from the same using a suitable feature extraction algorithm, as similarly discussed above. Alternatively, the computing device 501 may extract the query image features 503b locally using a local feature extraction algorithm. In turn, the computing device 501 can send the extracted query image features 503b to the image matching system. In this respect, the system can calculate query feature descriptors for the received extracted query features. In an aspect, the extracted query image features 503b may be pushed to or pulled by the logo matching service based on one or more of a periodic basis, aperiodic basis, a scheduled basis or a non-scheduled basis. In some embodiments, the extracted query image features 503b are communicated to the logo matching service through an application programming interface (API) using one or more communication protocols. In an aspect, the extracted query image features 503b are sent from a memory of the computing device 501.

After logo images stored in an image database 302 are processed 505 and features are extracted 304, visual words 507 may be assigned to (or correlated with) corresponding feature descriptors 509. The visual words are then compared against an index 306 by index searcher 312 to identify a match result 314. The index searcher 312 may perform both a spatial and temporal matching based on the visual content of each matched feature descriptor.

In some aspects, predictive analytics 511 is performed on the search results to determine usage patterns relating to the corresponding product brand. In turn, the logo matching system can supply the match result 314 to the end user of the computing device 501. The predictive analytics 511 may be performed before or concurrent to the index comparison at index searcher 312.

As mentioned above, product marketers aggregate data on product/brand usage online using conventional techniques such as parsing text in hash-tagged content on social media including conventional ecommerce metrics. Photos (or images) that contain products from a specific brand can be useful since they provide detailed feedback about the habits and preferences of consumers in their natural setting; however, the visual data in these images needs to be recognized and searchable. As such, the present disclosure utilizes a combination of computer vision techniques to analyze images and collect product/brand usage data and trends to provide predictive analytics for targeted advertising and branding.

Vast amounts of rich visual data is generated daily on social media, with approximately 410 Million photos uploaded daily between popular social media sites (e.g., Facebook®, Twitter®). The fastest growing social networks in the world (e.g., Pinterest®, Instagram®, Facebook®, Snapchat®, Twitter®) are primarily photo based. Processing and understanding the rich visual data and translating that data into useful insights that brands can use to drive marketing and advertising decisions is a key technology to become part of the advertising technology. Sales opportunities are missed daily when users are not targeted based on their photos (and accompanying visual data).

As such, the predictive analytics 511 of the present disclosure relates to computer vision analysis of images known to contain a brand logo to render insights into not only one specific brand, but a vast array of brands in multiple industries. Ongoing analysis of new images posted over time would show changes to trends for different types of consumers, in different geographies, providing detailed feedback about the habits and preferences of consumers in their natural setting. The predictive analytics 511 can generate data that represents time series data to be used to measure the success of ad campaigns and promotions over time.

The predictive analytics 511 can also measure changes in consumer sentiment, habits including competitive analysis. For example, the predictive analytics 511 can provide logo detection of other brands in a collection of branded images to show competitive and complementary products to that brand, such as images with the Nike® logo might also show Adidas®, a competitive brand, and PowerAde®, a complementary brand. In another example, the predictive analytics 511 can provide scene and activity understanding provided by deep learning, OCR, geo-tagging, image segmentation techniques to provide better context and details about product usage, such as Pepsi® may be popular with Doritos® in the living room, whereas certain branded burgers are popular in the park, and Triscuits® are popular in the kitchen. The aforementioned visual details allow brand managers to discover and follow newly detectable trends per-region, per-season, per-demographic group, and the like, thus enabling the brand managers to launch more targeted ad campaigns and initiate better partnerships.

There can be several benefits of implementing the present disclosure relating to predictive analytics. The benefits with respect to a third party service provider (e.g., an electronic marketplace) can include: (1) brand analytics that provide deeper insights into customer demographics, behavior and product usage; (2) better product recommendations made to respective customers; and (3) enable the third party service provider to act as an advertisement technology exchange, such as notifying third parties to bid for advertising in certain geo-locations or for certain demographic groups since a correlation between certain products and certain regions/weather/activities can be observed in social media.

A system associated with the logo matching service, such as a server, can be configured to perform the predictive analytics 511. The system can obtain image information associated with a particular user, in which the image information may contain one or more objects relating to a logo for a particular product or service. In some aspects, the system obtains visual data that includes content related to a marketing campaign associated with the particular product or service. The visual data may be obtained from a client computing device associated with the particular user. In this example, the client computing device is associated with the particular user that elected to opt into the marketing campaign. The client computing device may be communicatively coupled to the system over a first communication link. In an aspect, the visual data is obtained from a repository associated with the client computing device. The visual data may be obtained from a third party social network site that is communicatively coupled to the system through an intermediate server over a second communication link.

Given a collection of images that contain a logo for the same brand, the predictive analytics 511 can analyze the images using various computer vision techniques to identify product/brand usage along with useful data on the context such as region, activity, demographic, weather, location and overall sentiment. For example, the system can process the image information to extract one or more feature descriptors corresponding to the one or more objects. In some aspects, the one or more machine vision algorithms corresponds to at least one of logo match, image match, deep learning, optical character recognition (OCR), human recognition, poselet analysis, scene extraction, activity analysis, geographical tagging, or image segmentation. As such, the system can determine usage data associated with the particular product or service based at least in part on the one or more feature descriptors. In some aspects, the usage data corresponds to a specified time period for the particular user.

The predictive analytics 511 can compile and store the product/brand insights into an analytics database 513 for aggregating across time periods, querying, generating reports, etc. The insights may include details about competitive and complementary brands identified in the images, human behavior and activities where the brand is featured or not featured frequently, locations and accompanying product/brand appearance frequency, weather in specific locations and associated product/brand frequency, events that may have impacted product/brand appearance frequency, and suggestions in terms of recommended actions to take given the stored data.

The system can aggregate the usage data with other usage data relating to different users across different time periods to compile a database of insight information with respect to the particular product or service. In this regard, the system can further determine one or more usage patterns relating to the particular product or service based on the database of insight information. For example, data is gathered from multiple users to show statistical usage patterns, such as x % use product outdoors and y % use product in kitchen, where x and y are positive integers. In another example, the data is gathered to show trends, such as Pepsi® showed up in more images in Florida this week—perhaps there was a regional ad campaign that was successful, or the weather was simply hotter. In this embodiment, the system can obtain additional usage data relating to other products or services, including at least one of a competitive brand or a complementary brand.

In some aspects, the one or more usage patterns enable generation of recommendations for targeted advertisements of the particular product or service. The one or more usage patterns may include data identifying a correlation between the particular product or service and at least one of a geographical region, weather, an activity or a demographic.

The system can generate recommendation information relating to targeted advertisements associated with the particular product or service based at least in part on the contextual information. In this regard, the system can facilitate delivery of the recommendation information to a network entity associated with the marketing campaign. In some aspects, textual information related to images is combined with visual data to provide deeper and more robust insights. In some embodiments, visual analysis can be used to predict hash-tag text that might be related to the content, including a notification of a misspelled hash-tag to users. Such notification may be displayed as a prompt to the user or an alert up to an expiry of a prescribed term.

Figure 6:
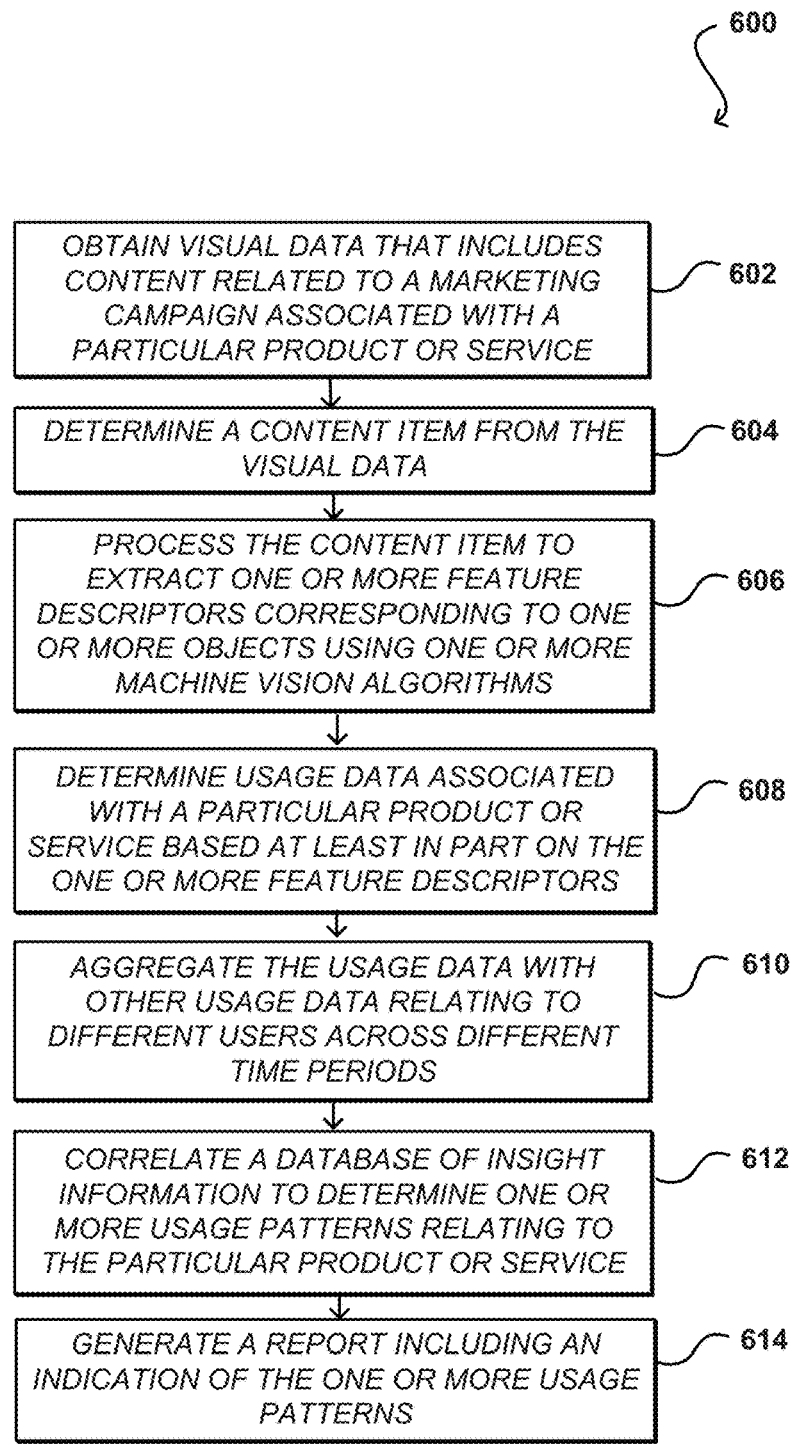
FIG. 6 illustrates a flow chart of example process for predictive analytics from visual data on a computing device, according to certain aspects of the subject technology.

FIG. 6 illustrates a flow chart of example process 600 for predictive analytics from visual data on a computing device, such as a server that is communicatively coupled to a client computing device, e.g., the computing device 202 as shown in FIGS. 2A-2C. It should be understood that, for this and other processes discussed herein, there can be additional, fewer, or alternative steps, performed in similar or alternative steps, or in parallel, within the scope of the various embodiments unless otherwise stated.

In step 602, the computing device can obtain visual data that includes content related to a marketing campaign associated with a particular product or service. In step 604, the computing device can determine a content item from the visual data, the content item including image information associated with a particular user. The image information may contain one or more objects relating to a logo for the particular brand or product.

In step 606, the computing device can process the content item to extract one or more feature descriptors corresponding to the one or more objects using one or more machine vision algorithms. In step 608, the computing device can determine usage data associated with the particular product or service based at least in part on the one or more feature descriptors. In this example, the usage data may correspond to usage of the particular user for a specified time period.

In step 610, the computing device can aggregate the usage data with other usage data relating to different users across different time periods to compile a database of insight information with respect to the particular product or service. In step 612, the computing device can determine one or more usage patterns relating to the particular product or service based at least in part on the database of insight information. In step 614, the computing device can generate a report including an indication of the one or more usage patterns.

Figure 7:
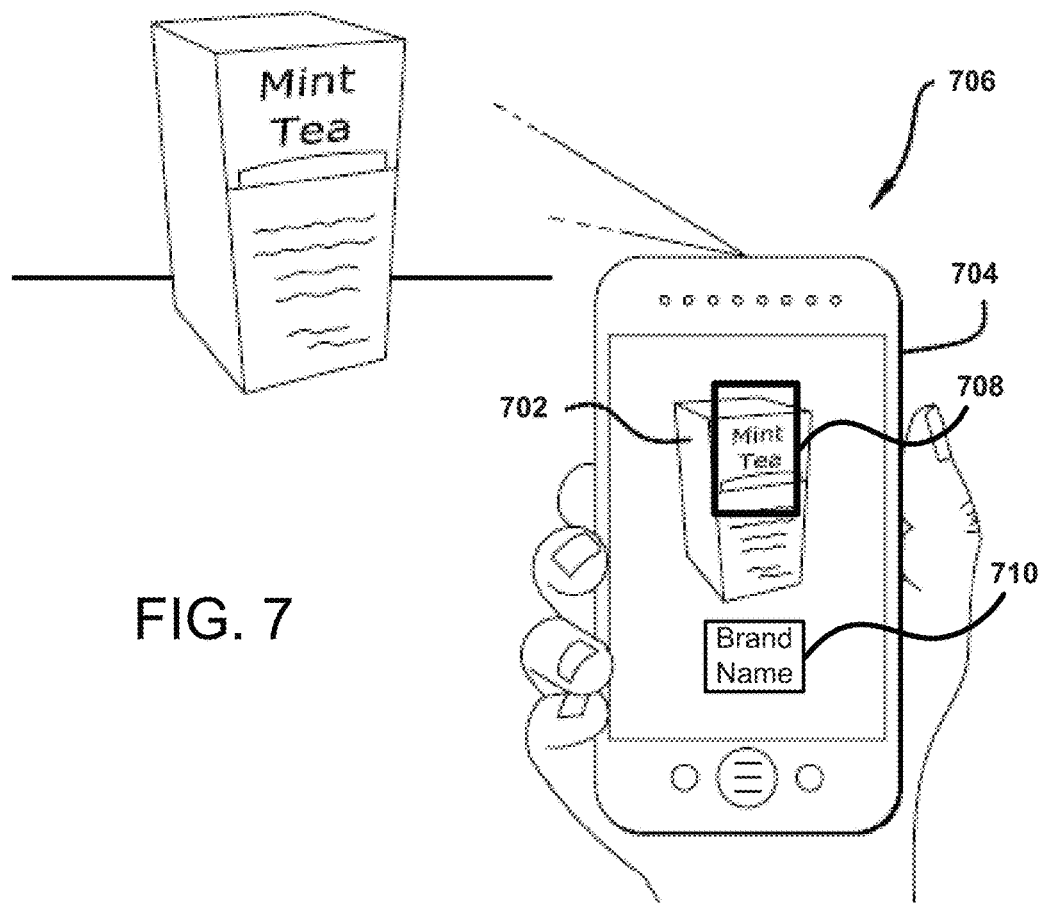
FIG. 7 illustrates an example of a user auto-capturing an image of an item with a computing device using object recognition, according to certain aspects of the subject technology.

FIG. 7 illustrates example situation 700 wherein an image of a box of mint tea 702 is captured automatically by a computing device 704 based on the image detected to contain a matching brand logo. It should be understood that the logo is one example of a recognized object, and that other identified or matching image data can be used to cause the automatic capture of an image within the scope of the various embodiments.

The computing device 704 can receive user input corresponding to an action for activating an application associated with the at least one image capture device. The computing device 704 can detect image information of an environment at which a computing device is located using at least one image capture device of the computing device. The image information can include data for one or more objects within a field of view of the at least one image capture device. In turn, the computing device 704 can send the detected image information to a matching service.

The computing device 704 can receive an indication from the matching service that at least a portion of the detected image information corresponds to a matching object, which in this example is associated with a marketing campaign. The matching object can relate to a logo associated with a particular brand or product. The received indication may include a success code and data for locating a bounding box 708 with respect to the at least a portion of the detected image information. In an aspect, the received indication includes a brand name caption 710 to describe the matching object textually. The brand name caption 710 can include information relating to the particular brand or product. The received indication may include data for marking a metadata portion of the detected image information with tag information relating to the marketing campaign. The tag information may include at least one of a first object representing the bounding box or a second object representing the logo. For other recognized objects, such as monuments, the metadata and/or tag data can include information such as the name of the monument, location data, etc.

The computing device 704 can cause the detected image information to be stored based at least in part on the received indication. In this example, the detected image information is captured by the at least one image capture device irrespective of an action associated with user input. In some aspects, the image sent to the matching service can have a lower picture quality than the image captured by the computing device 704. The application may be configured to render data for displaying an action associated with the detected image information being captured by the at least one capture device. The rendered data may be displayed on the display screen concurrently with the detected image information being captured.

The computing device 704 can provide for display, on a display screen of the computing device, the image information including a user interface associated with the application. The user interface may include a graphical element associated with an input to initiate the capturing of the detected image information.

The computing device 704 can send the captured image information to a repository associated with the marketing campaign. The sent image information can include metadata relating to identifying information of a user associated with the computing device 704 and meta information identifying the at least the portion of the image information.

In other examples, the computing device 704 can send the captured image information to a third party social network site for sharing to other users associated with a user of the computing device 704. The sent image information may include an indication that identifies the at least a portion of the image information corresponding to the logo of the marketing campaign.

Figure 8:
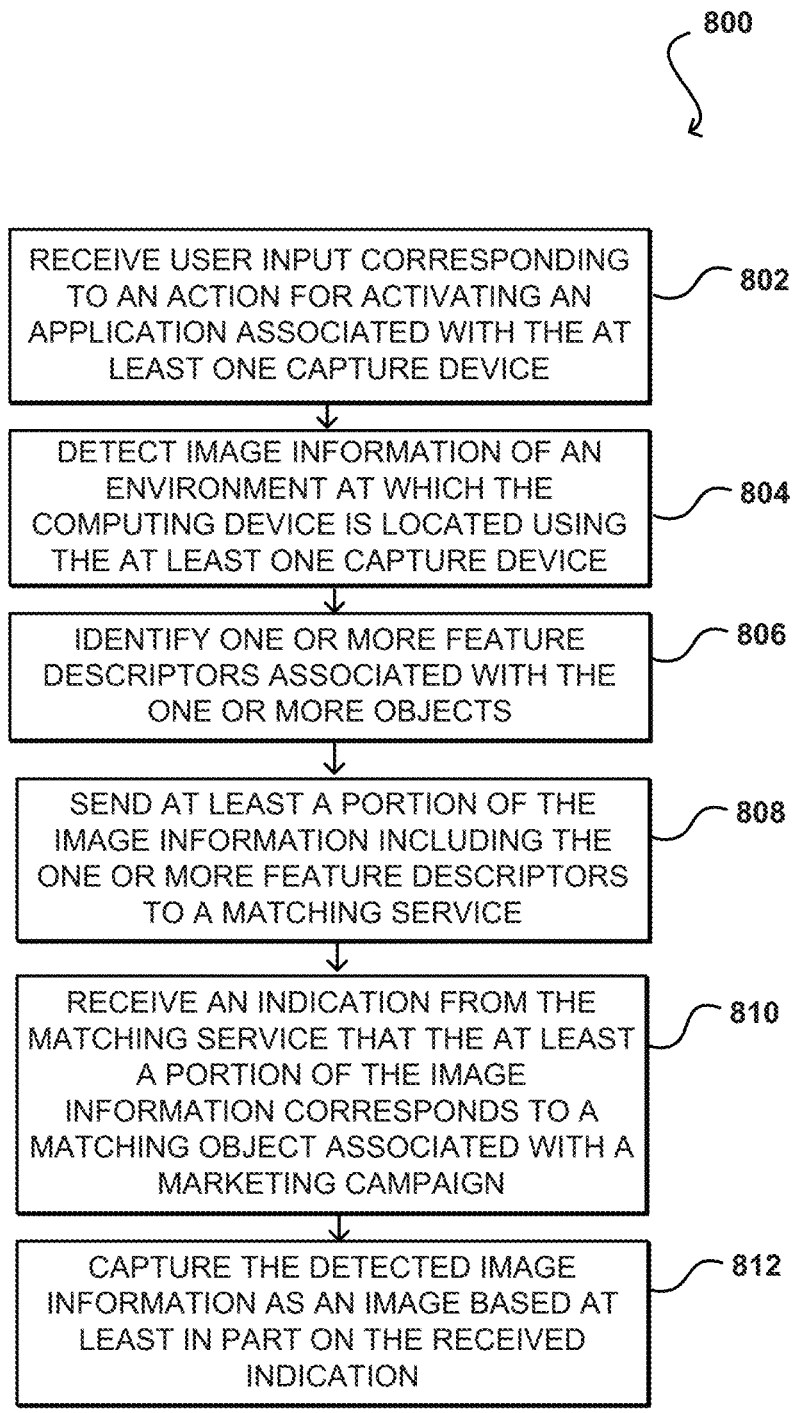
FIG. 8 illustrates a flow chart of example process for auto-snap using object recognition on a computing device, according to certain aspects of the subject technology.

FIG. 8 illustrates a flow chart of example process 800 for auto-snap using logo recognition on a computing device, e.g., the computing device 202 as shown in FIGS. 2A-2C, in accordance with various embodiments. It should be understood that, for this and other processes discussed herein, there can be additional, fewer, or alternative steps, performed in similar or alternative steps, or in parallel, within the scope of the various embodiments unless otherwise stated.

In step 802, the computing device can receive user input corresponding to an action for activating an application associated with at least one image capture device of the computing device. In step 804, the computing device can detect image information of an environment at which the computing device is located using the at least one image capture device. The image information may include data for one or more objects within a field of view of the at least one capture device.

In step 806, the computing device can identify one or more feature descriptors associated with the one or more objects. In step 808, the computing device can send at least a portion of the image information including the one or more feature descriptors to a matching service. The matching service can be associated with a network entity that is communicatively coupled to the computing device over a communication link.

In step 810, the computing device can receive an indication from the matching service that the at least a portion of the image information corresponds to a matching object, such as may be associated with a marketing campaign or other collection of matching data (e.g., a database of monuments or visual locations). For example, the matching object can relate to a logo associated with a particular brand or product as discussed elsewhere herein. In step 812, the computing device can capture the detected image information as an image based at least in part on the received indication. In some aspects, the computing device can send tag information to a repository associated with the marketing campaign. In this embodiment, the tag information includes an indication of the matching object to enable the marketing campaign to acknowledge an interest of a user of the computing device through the marketing campaign.

Figure 9:
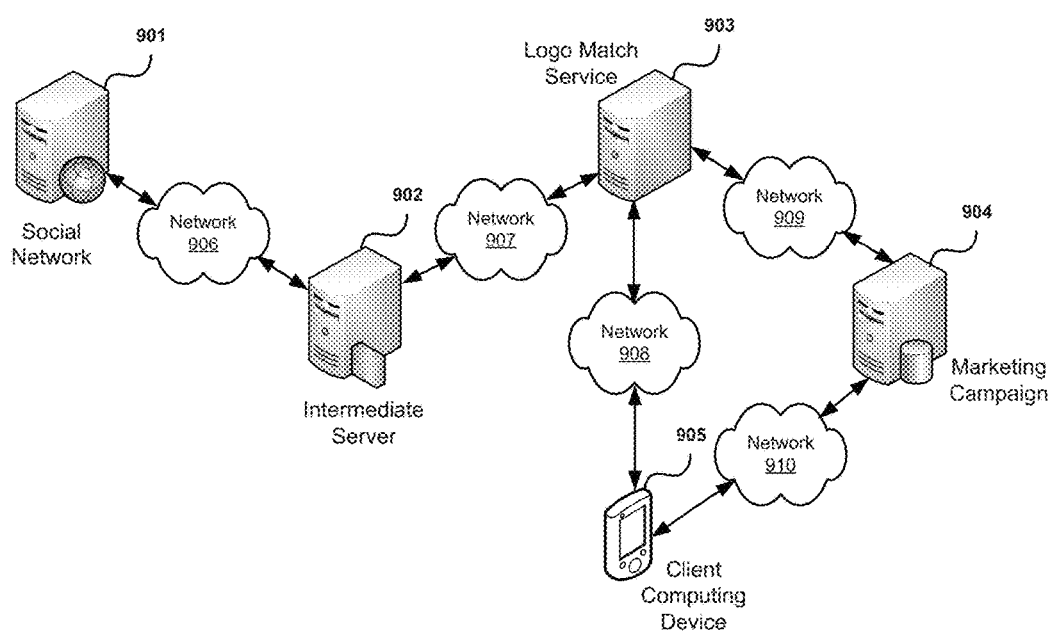
FIG. 9 illustrates an example of a system arrangement for implementing aspects in accordance with various embodiments of the subject technology.

FIG. 9 illustrates an example of a system arrangement 900 for implementing aspects in accordance with various embodiments of the subject technology. In FIG. 9, the system arrangement 900 includes network entities 901-904, client computing device 905 and networks 906-910. Although a wireless-based environment is described for purposes of explanation, different environments may be used, as appropriate, to implement various embodiments.

In FIG. 9, the logo matching service, as described with respect to FIGS. 2-4, is associated with network entity 903 that is communicatively coupled to the client computing device 905 over a communication link through the network 908. The network entity is communicatively coupled to an intermediate server associated with the network entity 902 over a second communication link through network 907.

The logo matching service at the network entity 903 is communicatively coupled to the marketing campaign associated with the network entity 904 over a third communication link through the network 909. In addition, the marketing campaign at the network entity 904 is communicatively coupled to the client computing device 905 through the network 910. The marketing campaign may include a repository that is associated with the network entity 904.

In this arrangement, the logo matching service can obtain image information from the client computing device 905 or the intermediate server depending on implementation. In this example, the user of the client computing device 905 may be determined to have elected to opt into a marketing campaign for a particular brand or product. In an aspect, the intermediate server can obtain content for the logo matching service from a social network site associated with the network entity 901 through the network 906. The content at the social network site may be associated with a profile of the user of the client computing device 905.

The logo matching service at the network entity 903 can send a matching result with an indication of the detected image with the corresponding brand logo to the client computing device 905. In addition, the logo matching service can access the repository of the marketing campaign at the network entity 904 to obtain one or more stored logo images and/or feature descriptors relating to the stored logo images. In response to the received indication at the client computing device 905, tag information can be sent from the client computing device 905 to the marketing campaign at the network entity 904.

Figure 10:
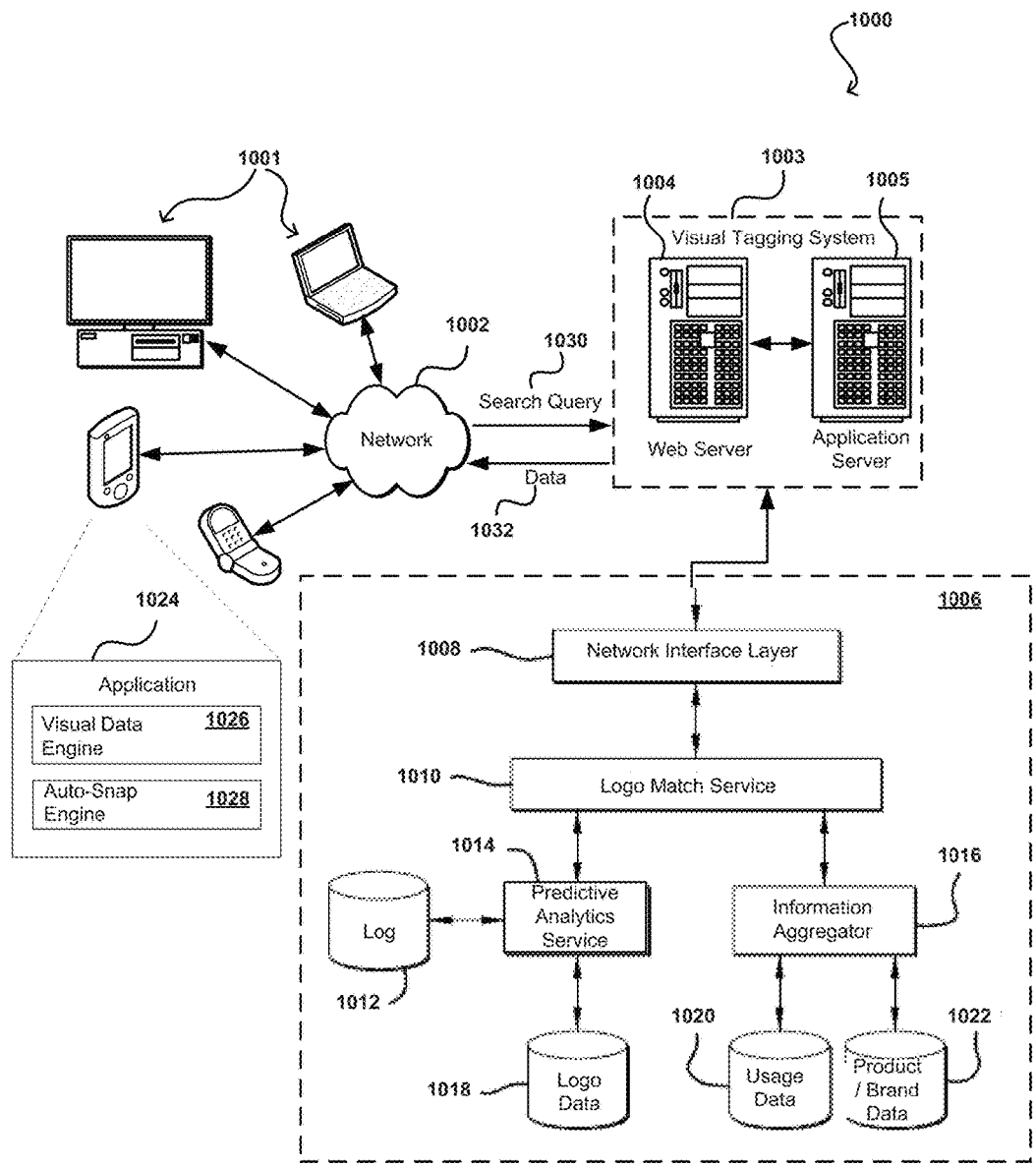
FIG. 10 illustrates an example of an environment for implementing aspects in accordance with various embodiments of the subject technology.

FIG. 10 illustrates an example of an environment 1000 for implementing aspects in accordance with various embodiments. Although a web-based environment is described for purposes of explanation, different environments may be used, as appropriate, to implement various embodiments.

The example environment 1000 includes a visual tagging system 1003 and a content provider 1006. The visual tagging system 1003 includes at least one web server 1004 and at least one application server 1005, as described below. The visual tagging system 1003 is an example of an interactive visual tagging system implemented as computer programs on one or more computers in one or more locations, in which the systems, components, and techniques described below can be implemented.

A user can interact with the visual tagging system 1003 through a client device 1001. For example, the client device 1001 can be a computer coupled to the visual tagging system 1003 through a data communication network 1002, e.g., the Internet. In some instances, the visual tagging system 1003 can be implemented on the client device 1001, for example, through a software application executing on the client device 1001. The client device 1001 generally includes a memory, e.g., a random access memory (RAM), for storing instructions and data, and a processor for executing stored instructions. The client device 1001 can be any appropriate device operable to send and receive requests, messages, or other types of information over the network 1002. The client device 1001 can also include a display screen though which a user interacting with the client device can view information, e.g., video streaming service. Some examples of client devices include personal computers, cellular phones, handheld messaging devices, laptop computers, set-top boxes, personal data assistants, electronic book readers, tablet devices, and the like.

The network 1002 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 1001 can communicate over the network using wired or wireless connections, and combinations thereof.

A user can use the client device 1002 to submit a request 1030 to the system 1003. The request 1030 can relate to one or more images obtained at the client device 1002. When the user submits the request 1030, the request 1030 may be transmitted through the network 1002 to a server 1004 within the visual tagging system 1003. The server 1004 can responds to the request 1030 by using, for example, a logo match service 1010, to identify data 1032 describing image information with a corresponding brand logo that satisfies the request 1030. The server 1004, in communication with the content provider 1006, sends the data 1032 through the network 1002 to the client device 1001 for presentation to the user.

In this example, the request 1030 is received at a network interface layer 1008 of the content provider 1006, via the web server 1004 and/or the application server 1005 of the search system 1003. The network interface layer 1008 can include any appropriate components known or used to receive requests from across the network 1002, such as may include one or more application programming interfaces (APIs) or other such interfaces for receiving such requests. The network interface layer 1008 might be owned and operated by the content provider 1006, or leveraged by the content provider 1006 as part of a shared resource or "cloud" offering. The network interface layer 1008 can receive and analyze the request 1030, and cause at least a portion of the information in the request 1030 to be directed to an appropriate system or service, such as the logo match service 1010. The logo match service 1010 in this example may include components operable to receive color data for a type of item, audio fingerprint for the type of item, lighting data for the type of item. In turn, the logo match service 1010 can analyze at least one of the aforementioned types of data for sets of video frames for the video. Further, the system may also accept query images relating to people, products, places, or things that can yield information of video content items that relate to such query image.

The logo match service 1010 in this example can cause information to be sent to at least one predictive analytics service 1014, device, system, or module that is operable to analyze the correlated descriptor data and attempt to locate one or more matches. In at least some embodiments, the predictive analytics service 1014 will process the received data, such as to extract feature points, correlate the feature points to create groups, and then compare the groups stored in a matching data store 1018 or other such location. The data in an image matching data store 1018 might be indexed and/or processed to facilitate with matching, as is known for such purposes.

The logo match service 1010 can receive information from the predictive analytics service 1014 as to whether one or more matches could be found with at least a threshold level of confidence, for example, and can receive any appropriate information for a located potential match. The information from each identification service can be analyzed and/or processed by one or more applications of the logo matching service, such as to determine data useful in obtaining information for each of the potential matches or products to provide to the user. For example, the logo match service 1010 might receive bar codes, product identifiers, or any other types of data from the predictive analytics service 1014, and might process that data to be provided to a service such as an information aggregator service 1016 that is capable of locating descriptions or other content related to the located potential matches. In an aspect, the information aggregator service 1016 may support both spatial and temporal matching if no client computing device is involved with the logo match service 1010.

In at least some embodiments, the information aggregator 1016 may be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 1016 can utilize the aggregated data from the logo match service 1010 to attempt to locate products, in a product/brand store 1022 or other such location, which are offered through the marketplace and that match, or are otherwise related to, the potential match information. For example, if the identification service identifies a type of movie with the desired item (e.g., product, location, person), the information aggregator 1016 can attempt to determine whether instances of that movie are offered through the marketplace, or at least for which information is available through the marketplace. In at least some embodiments, the information aggregator 1016 can utilize one or more suggestion algorithms or other such approaches to attempt to determine related elements that might be of interest based on the determined matches. In some embodiments, the information aggregator can return various types of data (or metadata) to the environmental information service, as may include item description, availability, reviews, and the like. In other embodiments, the information aggregator 1016 might instead return information such as a product identifier, uniform resource locator (URL), or other such digital entity enabling a browser or other interface on the client device 1001 to obtain information for one or more products, etc. The information aggregator 1016 can also utilize the aggregated data to obtain various other types of data as well. Information for located matches also can be stored in a usage data store 1020 of other such location, which can be used to assist in determining future potential matches or suggestions that might be of interest to the user. Various other types of information can be returned as well within the scope of the various embodiments.

The logo match service 1010 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device 1001 as the information becomes available. The potential matches located by the various identification services can be written to a log data store 1012 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 1006 in FIG. 10, that one or more of these identification services might be operated by third parties that offer these services to the content provider 1006.

The data 1032 can include data describing a particular product or brand. The data 1032 can be used, for example, by a client device 1001, to generate tag information to be displayed to the user on the client device 1001, and enable the user to tag the detected image with the corresponding brand logo.

After receiving the data 1032 from the server 1004, and through the network 1002, a software application, e.g., web browser or application 1024, running on the client device 1001 renders data for visually tagging image information containing a branded logo using the data 1032. For example, a visual data engine 1026 in the application 1024 can describe a received award from the brand based on the detected brand logo, for display on a display screen of the client device 1001. In some embodiments, the application 1024 includes an auto-snap engine 1028 that is configured to generate and send the search query 1030 to automatically capture images using logo recognition. In this example, the data 1032 can cause an image capture device of the client device 1001 to automatically capture (or store) the image information with the corresponding brand logo without the user having to trigger a function to initiate the image capture.

In some embodiments, the web server 1004, server 1005, and similar components, can be considered to be part of the content provider 1006. The handling of all requests and responses, as well as the delivery of content between the client device 1001 and the server 1005, can be handled by the web server 1004. The web server 1004 and server 1005 are merely example components. However, more or fewer components can be used as structured code can be executed on any appropriate device or host machine as discussed elsewhere herein.

The content provider 1006 includes one or more resources, servers, hosts, instances, routers, switches, data stores, other similar components, or a combination thereof. The resources of the content provider 1006 are not limited to storing and providing access to data. Indeed, there may be several servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the content provider 1006 can include several separate data tables, databases, or other data storage mechanisms and media for storing data relating to a particular aspect. For example, the content provider 1006 illustrated includes mechanisms for storing video content items and user information 1020, which can be used to serve content. The content provider 1006 is also shown to include a mechanism for storing log data 1012, which can be used for purposes such as reporting and analysis. The content provider 1006 is operable, through logic associated therewith, to receive instructions from the server 1005 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 10. Thus, the system 1000 in FIG. 10 is provided merely as one example, and does not limit the scope of the disclosure.

Figures 11A, 11B:
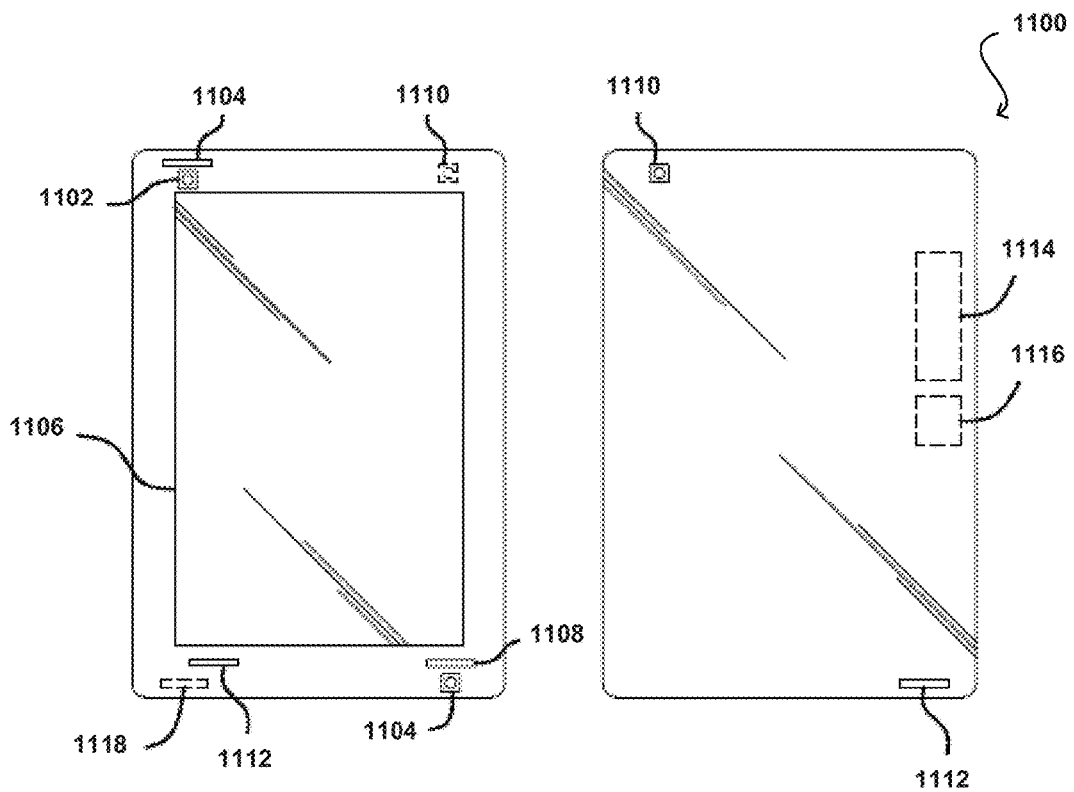
FIGS. 11A-11B illustrate front and back views of an example computing device, according to certain aspects of the subject technology.

FIGS. 11A-B illustrate front and back views, respectively, of an example computing device 1100 that can be used to perform approaches described in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1100 has a display screen 1102 (e.g., an LCD element) operable to display information or image content to one or more users or viewers of the device. The display screen of some embodiments displays information to the viewer's facing the display screen (e.g., on the same side of the computing device as the display screen). The computing device in this example can include one or more imaging elements, in this example including two image capture elements 1104 on the front of the device and at least one image capture element 1110 on the back of the device. It should be understood, however, that image capture elements could also, or alternatively, be placed on the sides or corners of the device, and that there can be any appropriate number of capture elements of similar or different types. Each image capture element 1104 and 1110 may be, for example, a camera, a charge-coupled element (CCD), a motion detection sensor or an infrared sensor, or other image capturing technology.

As discussed, the device can use the images (e.g., still or video) captured from the imaging elements 1104 and 1110 to generate a three-dimensional simulation of the surrounding environment (e.g., a virtual reality of the surrounding environment for display on the display element of the device). Further, the device can utilize outputs from at least one of the image capture elements 1104 and 1110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1108 on the front side, one microphone 1112 on the back, and one microphone 1106 on or near a top or side of the device. In some devices there may be only one microphone, while in other devices there might be at least one microphone on each side and/or corner of the device, or in other appropriate locations.

The device 1100 in this example also includes one or more orientation- or position-determining elements 1118 operable to provide information such as a position, direction, motion, or orientation of the device. These elements can include, for example, accelerometers, inertial sensors, electronic gyroscopes, and electronic compasses.

The example device also includes at least one communication mechanism 1114, such as may include at least one wired or wireless component operable to communicate with one or more electronic or computing devices. The device also includes a power system 1116, such as may include a battery operable to be recharged through conventional plug-in approaches, or through other approaches such as capacitive charging through proximity with a power mat or other such element. Various other elements and/or combinations are possible as well within the scope of various embodiments.

Figure 12:
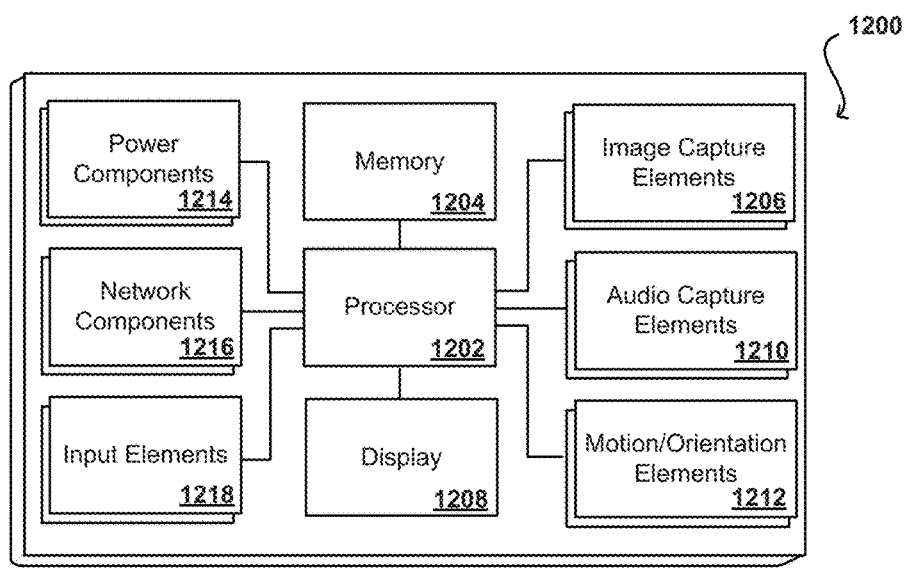
FIG. 12 illustrates an example configuration of components of a computing device, according to certain aspects of the subject technology.

FIG. 12 illustrates a logical arrangement of a set of general components of an example computing device 1200. In this example, the device includes a processor 1202 for executing instructions that can be stored in a memory device or element 1204. As would be apparent to one of ordinary skill in the art, the device can include many types of memory, data storage, or non-transitory computer-readable storage media, such as a first data storage for program instructions for execution by the processor 1202, a separate storage for images or data, a removable memory for sharing information with other devices, etc. The device typically will include some type of display element 1206, such as a touch screen or liquid crystal display (LCD), although devices such as portable media players might convey information via other means, such as through audio speakers. As discussed, the device in many embodiments will include at least one image capture element 1208 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1210, such as a mono or stereo microphone or microphone array, operable to capture audio information from at least one primary direction. A microphone can be a uni- or omni-directional microphone as known for such devices.

In some embodiments, the computing device 1200 of FIG. 12 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1200 also can include at least one orientation or motion sensor 1212. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as elements that enable location determinations through triangulation or another such approach. These mechanisms can communicate with the processor 1202, whereby the device can perform any of a number of actions described or suggested herein.

As an example, a computing device can capture and/or track various pieces of information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

CLAUSES

1. A computing device comprising:
   at least one processor; and
   memory storing instructions that, when executed by the at least one processor, cause a computing device to perform operations, comprising:
   receiving a query image from at least one of a client computing device over a first communication link or an intermediate network node over a second communication link, the client computing device associated with a user that elected to opt into a marketing campaign associated with a particular product or service;
   processing the query image to determine a matching object associated with the marketing campaign, the matching object relating to a logo associated with the particular product or service; and
   sending a matching result to the client computing device including at least an indication of the matching object including a success code and a bounding box with respect to the matching object, the matching result enabling the client computing device or the intermediate network node to send tag information to a repository associated with the marketing campaign, the tag information including an indication of the matching object to enable the marketing campaign to acknowledge the user through the marketing campaign.

2. The computing device of claim 1, wherein the success code relates to an indication of a successful match between the query image and logo information stored in a repository associated with the computing device.

3. The computing device of claim 1, wherein the instructions, when executed by the processor, further enable the computing system to:
   extract query feature descriptors from the query image;
   compare one or more of the extracted query feature descriptors to an index of feature descriptors included in the logo information to identify one or more logos that at least partially match the query image based at least in part on a respective number of query feature descriptors in the query image matching a respective number of feature descriptors in the index; and
   provide information relating to the one or more logos corresponding to the set of closest matching logos as matching the query image.

4. The computer-implemented device of claim 3, wherein the instructions, when executed by the processor, further enable the computing system to:
   receiving query feature descriptors including at least one of corresponding timestamp information or corresponding geographic data from the client computing device, the query feature descriptors extracted from the query image at the client computing device.

5. The computer-implemented device of claim 1, wherein the instructions, when executed by the processor, further enable the computing system to:
   receiving, as part of the marketing campaign, image data indicating at least one version of the logo associated with the particular product or service; and
   storing the image data for matching against the query image.

6. A computer-implemented method, comprising:
   under the control of one or more computer systems configured with executable instructions,
   determining a user, associated with the computing device, that elected to opt into a marketing campaign associated with a particular product or service;
   obtaining at least one content item associated with the user;
   determining at least one of a query image or a set of query frames included in the at least one content item;
   sending the at least one of the query image or a first query frame of the set of query frames to a matching service;
   receiving a matching result from the matching service, the matching result including at least an indication of a matching object included in the at least one of the query image or the first query frame, the matching object relating to a logo associated with the particular product or service; and
   sending tag information to a repository associated with the marketing campaign, the tag information including an indication of the matching object to enable the marketing campaign to acknowledge the user through the marketing campaign.

7. The computer-implemented method of claim 6, further comprising:
   obtaining a profile associated with the user from a third party social network site; and
   determining that one or more settings of the profile enable the user to opt into the marketing campaign, the one or more settings relating to privacy settings for a photo feed associated with the profile.

8. The computer-implemented method of claim 6, wherein the at least one content item is obtained from at least one of a third party social network site associated with the user, a local repository on the computing device, a repository on a cloud network communicatively coupled to the computing device, or an upload through an application running on the computing device.

9. The computer-implemented method of claim 6, wherein the matching result includes a success code and a bounding box with respect to the matching object, the success code relating to an indication of a successful match between the at least one of the query image or the first query frame and logo information stored in a repository associated with the matching service.

10. The computer-implemented method of claim 6, wherein the tag information includes metadata relating to a description of the matching object, a location of the bounding box and information about the user.

11. The computer-implemented method of claim 6, the instructions causing the computing device to perform further operations comprising:
    receiving advertisement data associated with the particular product or service based at least in part on the tag information.

12. The computer-implemented method of claim 6, further comprising:
    receiving one or more recommendations relating to the particular product or service based at least in part on the tag information.

13. The computer-implemented method of claim 6, further comprising:
    establishing a communication link with a network entity associated with the marketing campaign, the network entity including the repository, wherein the computing device sends the tag information to the network entity via the communication link; and
    establishing a second communication link with a second network entity associated with the matching service, wherein the computing device receives the matching result via the second communication link.

14. The computer-implemented method of claim 13, further comprising:
capturing image information representing the at least one content item using at least one capture device of the computing device, the computing device configured to store the captured image information in a second format based at least in part on an indication of a successful match included in the matching result, the second format having a picture quality that is greater than the first format.

15. The computer-implemented method of claim 1, wherein the image information is uploaded to a third party social network site.

16. A non-transitory computer readable storage medium storing instructions for logo match based visual tagging on a computing device, the instructions when executed by a processor causing the processor to:
obtain at least one content item associated with a user that elected to opt into a marketing campaign associated with a particular product or service;
determine at least one of a query image or a set of query frames included in the at least one content item;
send the at least one of the query image or a first query frame of the set of query frames to a first network entity associated with a matching service;
receive a matching result from the matching service, the matching result including at least an indication of a matching object included in the at least one of the query image or the first query frame, the matching object relating to a logo associated with the particular product or service; and
send tag information to a repository of a second network entity associated with the marketing campaign, the tag information including an indication of the matching object to enable the marketing campaign to acknowledge the user for the marketing campaign.

17. The computing system of claim 16, wherein the instructions, when executed by the processor, further enable the computing system to:
obtain a profile associated with the user from a third party social network site; and
determine that one or more settings of the profile enable the user to opt into the marketing campaign, the one or more settings relating to privacy settings for a photo feed associated with the profile.

18. The computing system of claim 16, wherein the matching result includes a success code and a bounding box with respect to the matching object, the success code relating to an indication of a successful match between the at least one of the query image or the first query frame and logo information stored in a repository associated with the matching service.

19. The computing system of claim 16, wherein the tag information includes metadata relating to a description of the matching object, a location of the bounding box and information about the user.

20. The computing system of claim 16, wherein the instructions, when executed by the processor, further enable the computing system to:
extract query feature descriptors from the query image; and
send the query feature descriptors including corresponding timestamp information to the first network entity.

21. A computing device, comprising:
a display screen;
at least one capture device;
at least one processor; and
memory storing instructions that, when executed by the at least one processor, cause a computing device to perform operations, comprising:
receiving user input corresponding to an action for activating an application associated with the at least one capture device;
detecting image information of an environment at which the computing device is located using the at least one capture device, the image information including data for one or more objects within a field of view of the at least one capture device;
sending at least a portion of the image information to a matching service, the matching service associated with a network entity that is communicatively coupled to the computing device over a communication link;
receiving an indication from the matching service that the at least a portion of the image information corresponds to a matching object associated with a marketing campaign, the matching object relating to a logo associated with a particular brand or product;
causing the detected image information to be stored as an image based at least in part on the received indication; and
sending tag information to a repository associated with the marketing campaign, the tag information including an indication of the matching object to enable the marketing campaign to acknowledge an interest of a user of the computing device through the marketing campaign.

22. The computing device of claim 21, wherein the detected image information is captured by the at least one capture device irrespective of an action associated with user input.

23. The computing device of claim 21, the instructions causing the computing device to perform further operations comprising:
sending the captured image information to a repository associated with the marketing campaign, the captured image information including metadata relating to identifying information of a user associated with the computing device and meta information identifying the at least the portion of the image information.

24. The computing device of claim 21, wherein the application is configured to render data for displaying an action associated with the detected image information being captured by the at least one capture device, and wherein the rendered data is displayed on the display screen concurrently with the detected image information being captured.

25. The computing device of claim 21, the instructions causing the computing device to perform further operations comprising:
sending the captured image information to a third party social network site for sharing to other users associated with a user of the computing device, the sent image information including an indication that identifies the at least a portion of the image information corresponding to the logo of the marketing campaign.

26. The computing device of claim 21, the instructions causing the computing device to perform further operations comprising:
identifying one or more feature descriptors associated with the one or more objects; and
sending the one or more feature descriptors as the portion of the image information including to the matching service.

27. A computer-implemented method, comprising:
under the control of one or more computer systems configured with executable instructions, detecting image information of an environment at which a computing device is located using at least one capture device of the computing device, the image information including data for one or more objects within a field of view of the at least one capture device;

sending at least a portion of the detected image information to a matching service;

receiving an indication from the matching service that the detected image information corresponds to a matching object from a matching data store; and causing the detected image information to be stored as an image based at least in part on the received indication.

28. The computer-implemented method of claim 27, wherein the detected image information is captured by the at least one capture device irrespective of an action associated with user input.

29. The computer-implemented method of claim 27, further comprising:

sending the captured image information to a repository, the sent image information including metadata relating to identifying information of a user associated with the computing device and meta information identifying the at least the portion of the image information.

30. The computer-implemented method of claim 27, further comprising:

receiving user input corresponding to an action for activating an application associated with the at least one capture device, wherein the application is configured to display at least a portion of the detected image information concurrent with the detected image information being captured.

31. The computer-implemented method of claim 27, further comprising:

sending the captured image information to a third party social network site for sharing to other users associated with a user of the computing device, the sent image information including an indication that identifies the at least a portion of the image information.

32. The computer-implemented method of claim 27, wherein the matching object is associated with a marketing campaign and relates to a logo associated with a particular brand or product of the marketing campaign.

33. The computer-implemented method of claim 27, further comprising:

providing for display, on the display screen, the image information including a user interface associated with the application, the user interface including a graphical element associated with an input to initiate the capturing of the detected image information.

34. The computer-implemented method of claim 27, wherein the received indication includes a success code and data for locating a bounding box with respect to the at least a portion of the detected image information.

35. The computer-implemented method of claim 34, wherein the received indication includes data for marking the detected image information with tag information includes at least one of a first object representing the bounding box or a second object representing the logo.

36. A non-transitory computer readable storage medium storing instructions for visual tagging on a computing device, the instructions when executed by a processor causing the computing device to:

detect image information of an environment at which the computing device is located using at least one capture device of the computing device, the image information including data for one or more objects within a field of view of the at least one capture device;

send at least a portion of the detected image information to a matching service;

receive an indication from the matching service that the at least a portion of the detected image information corresponds to a matching object from a matching data store; and cause the detected image information to be stored as an image based at least in part on the received indication, the detected image information being captured by the at least one capture device irrespective of an action associated with user input.

37. The non-transitory computer readable storage medium of claim 36, wherein the instructions, when executed by the processor, further enable the computing device to:

send the captured image information to a repository associated with a marketing campaign, the sent image information including metadata relating to identifying information of a user associated with the computing device and meta information identifying the at least the portion of the image information.

38. The non-transitory computer readable storage medium of claim 36, wherein the instructions, when executed by the processor, further enable the computing device to:

receive user input corresponding to an action for activating an application associated with the at least one capture device, wherein the application is configured to render data for displaying an action associated with the detected image information being captured by the at least one capture device, and wherein the rendered data is displayed on the display screen concurrently with the detected image information being captured.

39. The non-transitory computer readable storage medium of claim 36, wherein the instructions, when executed by the processor, further enable the computing device to:

send the captured image information to a third party social network site for sharing to other users associated with a user of the computing device.

40. The non-transitory computer readable storage medium of claim 36, wherein the received indication includes a success code and data for locating a bounding box with respect to the at least a portion of the detected image information, and wherein the received indication includes data for marking the detected image information with tag information.

41. A computing device comprising:

at least one processor; and memory storing instructions that, when executed by the at least one processor, cause the computing device to:

obtain visual data that includes content related to a marketing campaign, the marketing campaign associated with a particular product or service;

determine a content item from the visual data, the content item including image information associated with a user, the image information containing a representation of one or more objects relating to a logo for the particular product or service;

determine usage data associated with the particular product or service based at least in part on the content item, the usage data corresponding to usage of the user for a specified time period;

aggregate the usage data with other usage data relating to different users across different time periods to compile a database of insight information with respect to the particular product or service;

determine one or more usage patterns relating to the product or service based at least in part on the database of insight information; and generate a report including an indication of the one or more usage patterns.

42. The computing device of claim 41, wherein the instructions when executed further cause the computing device to:

receive the visual data from a client computing device associated with the user who elected to opt into the marketing campaign.

43. The computing device of claim 41, wherein the one or more machine vision algorithms corresponds to at least one of logo match, image match, deep learning, optical character recognition (OCR), human recognition, poselet analysis, scene extraction, activity analysis, or image segmentation.

44. The computing device of claim 41, wherein the instructions when executed further cause the computing device to:

determine one or more scenes for the content item, each scene of the one or more scenes including a respective set of frames;

extract, from at least one frame of the respective set of frames, a set of feature descriptors represented in the one or more scenes; and determine contextual information relating to the usage data based at least in part on the extracted set of feature descriptors.

45. The computing device of claim 44, wherein the instructions when executed further cause the computing device to:

generate recommendation information relating to targeted advertisements associated with the particular product or service based at least in part on the contextual information; and facilitate delivery of the recommendation information to a network entity associated with the marketing campaign.

46. The computing device of claim 41, wherein the instructions when executed further cause the computing device to:

process the content item to extract one or more feature descriptors corresponding to the one or more objects using one or more machine vision algorithms, wherein the usage data associated with the particular product or service is determined further based at least in part on the one or more feature descriptors.

47. A computer-implemented method, comprising:

under the control of one or more computer systems configured with executable instructions,
obtaining image information associated with a user, the image information containing one or more objects relating to a logo for a product or service;
determining usage data associated with the product or service based at least in part on the image information, the usage data corresponding to usage of the user for a specified time period;
aggregating the usage data with other usage data relating to different users across different time periods to compile a database of insight information with respect to the product or service; and
determining one or more usage patterns relating to the product or service based at least in part on the database of insight information, the one or more usage patterns enabling generation of recommendations for targeted advertisements of the product or service.

48. The computer-implemented method of claim 47, further comprising:

obtaining visual data that includes content related to a marketing campaign associated with the product or service, wherein the visual data is obtained from at least one of a client computing device associated with the user, a repository associated with the client computing device, or a third party social network site.

49. The computer-implemented method of claim 47, further comprising:

determining one or more scenes for the image information, each scene of the one or more scenes including a respective set of frames;

extracting, from at least one frame of the respective set of frames, a set of feature descriptors represented in the one or more scenes; and determining contextual information relating to the usage data based at least in part on the extracted set of feature descriptors, wherein the determining of the one or more scenes comprises determining at least one scene boundary for each of the one or more scenes, the at least one scene boundary including a start frame, an end frame and a middle frame between the start and end frames.

50. The computer-implemented method of claim 47, wherein the one or more machine vision algorithms corresponds to at least one of logo match, image match, deep learning, optical character recognition (OCR), human recognition, poselet analysis, scene extraction, activity analysis, or image segmentation.

51. The computer-implemented method of claim 47, further comprising:

generating recommendation information relating to targeted advertisements associated with the product or service based at least in part on the contextual information; and facilitating delivery of the recommendation information to a network entity associated with the marketing campaign.

52. The computer-implemented method of claim 47, further comprising:

processing the image information to extract one or more feature descriptors corresponding to the one or more objects, the being further determined based at least in part upon the one or more feature descriptors.

53. The computer-implemented method of claim 47, wherein the one or more usage patterns include data identifying a correlation between the product or service and at least one of a geographical region, weather, an activity, or a demographic.

54. The computer-implemented method of claim 47, wherein aggregating the usage data comprises obtaining additional usage data relating to other products or services, the other products or services including at least one of a competitive brand or a complementary brand.

55. A non-transitory computer readable storage medium storing instructions for predictive analytics from visual data on a computing device, the instructions when executed by a processor causing the processor to:

obtain image information associated with a particular user, the image information containing one or more objects relating to a logo for a particular brand or product;

determine usage data associated with the particular product or service based at least in part on the image information, the usage data corresponding to usage of the particular user for a specified time period;

aggregate the usage data with other usage data relating to different users across different time periods to compile a database of insight information with respect to the particular product or service;

determine one or more usage patterns relating to the product or service based at least in part on the database of insight information, the one or more usage patterns enabling generation of recommendations for targeted advertisements of the particular product or service; and facilitate generation of a report including an indication of the one or more usage patterns.

56. The non-transitory computer readable storage medium of claim 55, wherein the instructions, when executed by the processor, further enable the computing system to:

obtain visual data that includes content related to a marketing campaign associated with a particular product or service, wherein the visual data is obtained from at least one of a client computing device associated with the particular user, a repository associated with the client computing device, or a third party social network site.

57. The non-transitory computer readable storage medium of claim 55, wherein the one or more machine vision algorithms corresponds to at least one of logo match, image match, deep learning, optical character recognition (OCR), human recognition, poselet analysis, scene extraction, activity analysis, or image segmentation.

58. The non-transitory computer readable storage medium of claim 55, wherein the instructions, when executed by the processor, further enable the computing system to:

generate recommendation information relating to targeted advertisements associated with the particular product or service based at least in part on the contextual information; and facilitate delivery of the recommendation information to a network entity associated with the marketing campaign.

59. The non-transitory computer readable storage medium of claim 55, wherein the one or more usage patterns include data identifying a correlation between the particular product or service and at least one of a geographical region, weather, an activity or a demographic.

60. The non-transitory computer readable storage medium of claim 55, wherein aggregating the usage data comprises obtaining additional usage data relating to other products or services, the other products or services including at least one of a competitive brand or a complementary brand.

What is claimed is:

1. A computing device comprising:
    at least one processor; and
    memory storing instructions that, when executed by the at least one processor, cause the computing device to:
        obtain visual data that includes content related to a marketing campaign, the marketing campaign associated with a product or service;
        determine a content item from the visual data using a visual tagging system to match feature descriptors extracted from the visual data against known feature descriptors of known items in a data store, the visual tagging system located in a server that is in communication with a source providing the visual data, the content item including image information associated with a user, the image information containing a representation of one or more objects relating to a logo for the product or service;
        determine usage data associated with the product or service based at least in part on the content item from the visual data, the usage data corresponding to usage of the product or service by the user for a specified time period;
        aggregate the usage data with other usage data relating to different users across different time periods to compile a database of insight information with respect to the product or service;
        determine one or more usage patterns relating to the product or service based at least in part on the database of insight information; and
        generate a report including an indication of the one or more usage patterns.

2. The computing device of claim 1, wherein the instructions when executed further cause the computing device to:
    receive the visual data from a client computing device associated with the user who elected to opt into the marketing campaign.

3. The computing device of claim 1, wherein the one or more machine vision algorithms corresponds to at least one of logo match, image match, deep learning, optical character recognition (OCR), human recognition, poselet analysis, scene extraction, activity analysis, or image segmentation.

4. The computing device of claim 1, wherein the instructions when executed further cause the computing device to:
    determine one or more scenes for the content item, each scene of the one or more scenes including a respective set of frames;
    extract, from at least one frame of the respective set of frames, a set of feature descriptors represented in the one or more scenes; and
    determine contextual information relating to the usage data based at least in part on the extracted set of feature descriptors.

5. The computing device of claim 4, wherein the instructions when executed further cause the computing device to:
    generate recommendation information relating to targeted advertisements associated with the product or service based at least in part on the contextual information; and
    facilitate delivery of the recommendation information to a network entity associated with the marketing campaign.

6. The computing device of claim 1, wherein the instructions when executed further cause the computing device to:
    process the content item to extract one or more feature descriptors corresponding to the one or more objects using one or more machine vision algorithms, wherein the usage data associated with the product or service is determined further based at least in part on the one or more feature descriptors.

7. A computer-implemented method, comprising:
    under the control of one or more computer systems configured with executable instructions,
        obtaining image information associated with a user;
        matching, using a visual tagging system, feature descriptors extracted from the image information against known feature descriptors of known items in a data store, the visual tagging system located in a server that is in communication with a source providing the image information, and the feature descriptors providing identification for one or more objects relating to a logo for a product or service;
        determining usage data associated with the product or service based at least in part on the image information, the usage data corresponding to usage of the product or service by the user for a specified time period;
        aggregating the usage data with other usage data relating to different users across different time periods to compile a database of insight information with respect to the product or service; and
        determining one or more usage patterns relating to the product or service based at least in part on the database of insight information, the one or more usage patterns enabling generation of recommendations for targeted advertisements of the product or service.

8. The computer-implemented method of claim 7, further comprising:
obtaining visual data that includes content related to a marketing campaign associated with the product or service, wherein the visual data is obtained from at least one of a client computing device associated with the user, a repository associated with the client computing device, or a third party social network site.

9. The computer-implemented method of claim 7, further comprising:
determining one or more scenes for the image information, each scene of the one or more scenes including a respective set of frames;
extracting, from at least one frame of the respective set of frames, a set of feature descriptors represented in the one or more scenes; and
determining contextual information relating to the usage data based at least in part on the extracted set of feature descriptors,
wherein the determining of the one or more scenes comprises determining at least one scene boundary for each of the one or more scenes, the at least one scene boundary including a start frame, an end frame and a middle frame between the start and end frames.

10. The computer-implemented method of claim 7, wherein the one or more machine vision algorithms corresponds to at least one of logo match, image match, deep learning, optical character recognition (OCR), human recognition, poselet analysis, scene extraction, activity analysis, or image segmentation.

11. The computer-implemented method of claim 7, further comprising:
generating recommendation information relating to targeted advertisements associated with the product or service based at least in part on the contextual information; and
facilitating delivery of the recommendation information to a network entity associated with the marketing campaign.

12. The computer-implemented method of claim 7, further comprising:
processing the image information to extract one or more feature descriptors corresponding to the one or more objects, the being further determined based at least in part upon the one or more feature descriptors.

13. The computer-implemented method of claim 7, wherein the one or more usage patterns include data identifying a correlation between the product or service and at least one of a geographical region, weather, an activity, or a demographic.

14. The computer-implemented method of claim 7, wherein aggregating the usage data comprises obtaining additional usage data relating to other products or services, the other products or services including at least one of a competitive brand or a complementary brand.

15. A non-transitory computer readable storage medium storing instructions for predictive analytics from visual data on a computing device, the instructions when executed by a processor causing the processor to:
obtain image information associated with a user;
match, using a visual tagging system, feature descriptors extracted from the image information against known feature descriptors of known items in a data store, the visual tagging system located in a server that is in communication with a source providing the image information, and the feature descriptors providing identification for one or more objects relating to a logo for a brand or product;
determine usage data associated with the product or service based at least in part on the image information, the usage data corresponding to usage of the product or service by the user for a specified time period;
aggregate the usage data with other usage data relating to different users across different time periods to compile a database of insight information with respect to the product or service;
determine one or more usage patterns relating to the product or service based at least in part on the database of insight information, the one or more usage patterns enabling generation of recommendations for targeted advertisements of the product or service; and
facilitate generation of a report including an indication of the one or more usage patterns.

16. The non-transitory computer readable storage medium of claim 15, wherein the instructions, when executed by the processor, further enable the computing system to:
obtain visual data that includes content related to a marketing campaign associated with the product or service, wherein the visual data is obtained from at least one of a client computing device associated with the user, a repository associated with the client computing device, or a third party social network site.

17. The non-transitory computer readable storage medium of claim 15, wherein the one or more machine vision algorithms corresponds to at least one of logo match, image match, deep learning, optical character recognition (OCR), human recognition, poselet analysis, scene extraction, activity analysis, or image segmentation.

18. The non-transitory computer readable storage medium of claim 15, wherein the instructions, when executed by the processor, further enable the computing system to:
generate recommendation information relating to targeted advertisements associated with the product or service based at least in part on the contextual information; and
facilitate delivery of the recommendation information to a network entity associated with the marketing campaign.

19. The non-transitory computer readable storage medium of claim 15, wherein the one or more usage patterns include data identifying a correlation between the product or service and at least one of a geographical region, weather, an activity or a demographic.

20. The non-transitory computer readable storage medium of claim 15, wherein aggregating the usage data comprises obtaining additional usage data relating to other products or services, the other products or services including at least one of a competitive brand or a complementary brand.

* * * * *